United States Patent
Kato et al.

(10) Patent No.: US 8,573,711 B2
(45) Date of Patent: Nov. 5, 2013

(54) VEHICLE BRAKING APPARATUS SUPPRESSING EXCESSIVE SLIP OF WHEEL DURING BRAKING

(75) Inventors: Hidehisa Kato, Susono (JP); Junji Kawamuro, Susono (JP); Tetsuhiro Narita, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 187 days.

(21) Appl. No.: 13/121,808

(22) PCT Filed: Jan. 15, 2009

(86) PCT No.: PCT/JP2009/050488
§ 371 (c)(1),
(2), (4) Date: Mar. 30, 2011

(87) PCT Pub. No.: WO2010/044283
PCT Pub. Date: Apr. 22, 2010

(65) Prior Publication Data
US 2011/0184620 A1 Jul. 28, 2011

(30) Foreign Application Priority Data
Oct. 14, 2008 (JP) .................... PCT/JP2008/068604

(51) Int. Cl.
*B60T 15/46* (2006.01)
(52) U.S. Cl.
USPC ............ 303/84.1; 188/72.2; 188/151 R; 188/170; 188/313; 188/141; 303/9.62; 303/114.1
(58) Field of Classification Search
None
See application file for complete search history.

(56) References Cited

U.S. PATENT DOCUMENTS

| | | | | |
|---|---|---|---|---|
| 3,829,171 A | * | 8/1974 | Rockwell | 303/9.68 |
| 3,848,933 A | * | 11/1974 | Ochiai | 303/163 |
| 3,923,344 A | * | 12/1975 | Sekigawa et al. | 303/122.13 |
| 4,125,296 A | * | 11/1978 | Ochiai | 303/163 |
| 4,261,623 A | * | 4/1981 | Mizusawa | 303/9.67 |
| 4,805,102 A | * | 2/1989 | Ise et al. | 701/37 |
| 4,933,854 A | * | 6/1990 | Miyake | 701/78 |

(Continued)

FOREIGN PATENT DOCUMENTS

| | | |
|---|---|---|
| EP | 0 563 740 A1 | 10/1993 |
| JP | 6 255468 | 9/1994 |

(Continued)

OTHER PUBLICATIONS

International Search Report issued Apr. 28, 2009 in PCT/JP09/50488 filed Jan. 15, 2009.

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

A vehicle braking apparatus that can exert high braking performance during vehicle braking is implemented by a control mode that can be realized in a braking apparatus (10) of usual hardware. In controlling the braking apparatus (10) of a vehicle, a climb rate of a wheel cylinder braking oil pressure (Pw) is decreased smaller than a climb rate corresponding to a climb rate of a master cylinder oil pressure (Pm) from a time point at which the wheel cylinder braking oil pressure (Pw) reaches a predetermined threshold value. The time point at which the wheel cylinder braking oil pressure (Pw) reaches the predetermined threshold value (P3) is estimated based on the climb process of the master cylinder oil pressure (Pm) or directly detected.

20 Claims, 12 Drawing Sheets

(56) References Cited

U.S. PATENT DOCUMENTS

| | | | |
|---|---|---|---|
| 5,286,100 A * | 2/1994 | Takayama et al. | 303/163 |
| 6,027,182 A * | 2/2000 | Nakanishi et al. | 303/116.1 |
| 6,027,184 A | 2/2000 | Yonemura et al. | |
| 6,182,001 B1 | 1/2001 | Sugai et al. | |
| 6,199,963 B1 * | 3/2001 | Shimizu | 303/155 |
| 6,318,820 B1 * | 11/2001 | Usukura | 303/149 |
| 6,402,264 B1 * | 6/2002 | Otomo | 303/115.4 |
| 6,880,900 B2 * | 4/2005 | Hara et al. | 303/170 |
| 6,928,355 B2 * | 8/2005 | Nihei et al. | 701/71 |
| 7,165,818 B2 * | 1/2007 | Iwasaki et al. | 303/115.5 |
| 7,857,399 B2 * | 12/2010 | Kito et al. | 303/119.1 |
| 2002/0022919 A1 * | 2/2002 | Hara et al. | 701/70 |
| 2002/0024252 A1 | 2/2002 | Banno et al. | |
| 2002/0053828 A1 * | 5/2002 | Shimizu et al. | 303/113.4 |
| 2004/0074689 A1 * | 4/2004 | Baylis et al. | 180/274 |
| 2006/0170280 A1 * | 8/2006 | Nakayama et al. | 303/9.62 |
| 2007/0188021 A1 | 8/2007 | Maki et al. | |
| 2010/0117445 A1 * | 5/2010 | Kato et al. | 303/11 |
| 2010/0138122 A1 * | 6/2010 | Westerfeld et al. | 701/70 |

FOREIGN PATENT DOCUMENTS

| | | |
|---|---|---|
| JP | 7 242166 | 9/1995 |
| JP | 9 290731 | 11/1997 |
| JP | 10 264803 | 10/1998 |
| JP | 10 273022 | 10/1998 |
| JP | 11 34841 | 2/1999 |
| JP | 2001 322539 | 11/2001 |
| JP | 2007 15494 | 1/2007 |
| JP | 2007 216771 | 8/2007 |
| JP | 2008 207613 | 9/2008 |

* cited by examiner

VEHICLE BRAKING APPARATUS SUPPRESSING EXCESSIVE SLIP OF WHEEL DURING BRAKING

TECHNICAL FIELD

The present invention relates to a braking apparatus of a vehicle such as an automobile, particularly to a vehicle braking apparatus which suppresses a loss of a braking effect due to excessive slip during sudden braking.

BACKGROUND ART

Wheels slip on a road surface when a degree of braking is increased above a certain level during the braking of the vehicle such as an automobile. When the slip is increased, a friction coefficient acting between the wheel and the road surface turns downward after a maximum value. Therefore, when the braking is suddenly performed, a braking distance between where the vehicle stops and where the braking is started, becomes longer than a minimum braking distance that can be obtained by optimum braking. When the vehicle is braked, a vertical load of the wheel moves from a rear wheel side to a front wheel side to decrease the vertical load of the rear wheel, and a braking power of the rear wheel is decreased, while the vertical load of the front wheel is increased. Although the braking power that can be obtained by the front wheel is increased, there is a limitation to the increase in braking power caused by the increase in vertical load. Accordingly, when the degree of braking is increased above a certain level, braking ability is degraded as a whole in the front and rear wheels.

In a brake control apparatus including an Anti-lock braking systems ("ABS"), Patent Document 1 proposes a braking apparatus in order to prevent rear lift-up to improve vehicle stability. In the braking apparatus, a determination of high-G braking is made when a vehicle body deceleration detecting means detects that vehicle body deceleration exceeds a predetermined value after braking starts, a determination of sudden braking is made when an amount of temporal change of the vehicle body deceleration exceeds a predetermined value, and the braking power is moderately increased to the front wheel when the determinations of the high-G braking and sudden braking are made. Patent Document 2 discloses a braking apparatus in order that vehicle running is stabilized by starting a braking power distribution control in proper timing during the sudden braking. In the braking apparatus, a vehicle speed is detected from a wheel speed, the vehicle body deceleration is computed by differentiating the vehicle speed, and a vehicle body deceleration differential value is computed by further differentiating the vehicle body deceleration. When the vehicle body deceleration differential value reaches a predetermined threshold value, a determination that a stepping-on speed of a brake pedal is too fast is made to start the braking power distribution control in order to suppress the braking power of the rear wheel. Patent Document 3 discloses a braking apparatus in order that a good attitude of the vehicle is maintained by suppressing the lift-up of the vehicle body or nose-dive during the braking. In the braking apparatus, an ideal braking power distribution line indicating a braking power distribution relationship of front and rear wheels is assumed based on an ideal braking power distribution characteristic, a braking power distribution on a real braking power distribution line and a braking power distribution on the ideal braking power distribution line are compared when the deceleration is arbitrarily generated, a ratio of the braking power distribution of the front wheel in the former is set lower than a ratio of the braking power distribution of the front wheel in the latter, and the braking power distribution among the front and rear wheels is controlled based on the ratios.

Patent Document 1: Japanese Patent Application Laid-open No. 6-255468
Patent Document 2: Japanese Patent Application Laid-open No. 2007-15494
Patent Document 3: Japanese Patent Application Laid-open No. 2007-216771

DISCLOSURE OF INVENTION

Problem to be Solved by the Invention

When the vehicle braking is optimized, particularly when the braking is optimized to minimize the braking distance during the sudden braking of the vehicle, the braking ability of the wheel depends on the vertical load of the wheel, and the wheel slip on the road surface depends on the deceleration of the vehicle. Therefore, in principle a feedback control of the braking power applied to each wheel may optimally be performed based on the vehicle deceleration. However, because of a temporal delay before the deceleration is reflected on the braking power of the wheel by the feedback control, even if the feedback control is performed in the usual hardware braking apparatus, the braking control cannot properly be obtained with respect to the sudden braking.

In view of the foregoing, a object of the present invention is to implement a vehicle braking apparatus that can exert high braking performance during vehicle braking, particularly during the sudden braking, by a control mode that can be executed with the usual hardware of the braking apparatus.

Means for Solving Problem

In order to achieve the above mentioned object, the present invention proposes a vehicle braking apparatus, wherein a rate of increase of a wheel cylinder braking oil pressure is decreased less than a rate corresponding to a rate of increase of a master cylinder oil pressure from a time at which the braking oil pressure of a wheel cylinder reaches a predetermined threshold value during vehicle braking.

Further, in the vehicle braking apparatus, the predetermined threshold value is estimated based on the master cylinder oil pressure.

Further, in the vehicle braking apparatus, the predetermined threshold value may be estimated based on the master cylinder oil pressure. In this case, where tm1 is a time at which the master cylinder oil pressure reaches a predetermined first pressure in an braking initial stage in which a brake oil reducing amount is substantially proportional to the wheel cylinder braking oil pressure, where tm3 is a time at which the master cylinder oil pressure reaches a threshold value located in a region where an increment of the brake oil reducing amount is substantially proportional to an increment of the wheel cylinder braking oil pressure, and where tm2 is a time at which the master cylinder oil pressure reaches an oil pressure at a boundary between a relationship in which the brake oil reducing amount is proportional to the wheel cylinder braking oil pressure and a relationship in which the increment of the brake oil reducing amount is proportional to the increment of the wheel cylinder braking oil pressure, an elapsed time at which a time value (tm2−tm1) multiplied by a predetermined first factor and a time value (tm3−tm2) multiplied by a predetermined second factor elapse from the time tm1, may be estimated to be a time at which the wheel cylinder braking oil pressure reaches the predetermined threshold value. As used herein, the meaning of the "brake oil reducing amount" is defined in the following description.

Further, in the vehicle braking apparatus, the predetermined threshold value may be estimated by directly detecting the wheel cylinder braking oil pressure.

Further, in the vehicle braking apparatus, the rate of increase of the wheel cylinder braking oil pressure may be decreased less than a rate corresponding to the rate of increase of the master cylinder oil pressure from the time at which the wheel cylinder braking oil pressure reaches the predetermined threshold value, when sudden braking is performed to a wheel at a degree of braking demand that is not lower than a predetermined degree of braking demand.

Further, in the vehicle braking apparatus, the wheel cylinder may be a wheel cylinder of a front wheel.

Further, in the vehicle braking apparatus, one of a first pitching suppressing control and a second pitching suppressing control may be executed, where in the first pitching suppression suppressing control, the rate of increase of the wheel cylinder braking oil pressure corresponding to the front wheel is decreased to be less than a rate corresponding to the rate of increase of the master cylinder oil pressure during the vehicle braking from the time at which the wheel cylinder braking oil pressure of the front wheel reaches the predetermined threshold value, and in the second pitching suppressing control, the rate of increase of the wheel cylinder braking oil pressure corresponding to the front wheel is decreased less than a rate corresponding to the rate of increase of the master cylinder oil pressure during the vehicle braking when the master cylinder oil pressure reaches a control execution pressure while the first pitching suppressing control is not executed and a value related to a change in the master cylinder oil pressure reaches the control execution pressure.

Further, in the vehicle braking apparatus, the first pitching suppressing control may be executed when a determination of sudden stepping-on state is made based on the master cylinder oil pressure, where the state in which the first pitching suppressing control is not performed is a state in which a determination of not sudden stepping-on state is made.

Further, in the vehicle braking apparatus, a determination that the value related to the change in the master cylinder oil pressure reaches the control execution pressure may be made in a state in which the master cylinder oil pressure reaches an increased stepping-on determination pressure that is smaller than the control execution pressure.

Further, in the vehicle braking apparatus, a pitching suppressing control and a brake assist control can be individually executed, such that in the pitching suppressing control, the rate of increase of the wheel cylinder braking oil pressure corresponding to the front wheel is decreased less than the rate corresponding to the rate of increase of the master cylinder oil pressure from the time at which the wheel cylinder braking oil pressure of the front wheel reaches the predetermined threshold value during the vehicle braking, and in the brake assist control, the wheel cylinder braking oil pressure is forcedly boosted based on the master cylinder oil pressure by satisfying a brake assist control execution condition during the vehicle braking, and the brake assist control may not be executed until the pitching suppressing control is ended, when the brake assist control execution condition is satisfied in executing the pitching suppressing control.

Further, in the vehicle braking apparatus, a pitching suppression control and a right and left distribution control can individually be executed, where in the pitching suppressing control, the rate of increase of the wheel cylinder braking oil pressure corresponding to the front wheel is decreased less than a rate corresponding to the rate of increase of the master cylinder oil pressure from the time at which the wheel cylinder braking oil pressure of the front wheel reaches the predetermined threshold value during the vehicle braking, and in the right and left distribution control, at least a front wheel braking differential pressure is generated between the wheel cylinder braking oil pressure corresponding to the left front wheel and the wheel cylinder braking oil pressure corresponding to the right front wheel based on a vehicle attitude by satisfying a right and left distribution control execution condition during the vehicle braking, and the right and left distribution control may be executed when the right and left distribution control execution conditions of the right and left front wheels are satisfied in executing the pitching suppressing control.

Further, in the vehicle braking apparatus, the first pitching suppressing control, the second pitching suppressing control, and a brake assist control can individually be executed, such that in the brake assist control, the wheel cylinder braking oil pressure is forcedly boosted based on the master cylinder oil pressure by satisfying a brake assist control execution condition during the vehicle braking, and the brake assist control may not be executed until the pitching suppressing control is ended, when the brake assist control execution condition is satisfied in executing one of the first pitching suppressing control and the second pitching suppressing control.

Further, in the vehicle braking apparatus, the first pitching suppressing control, the second pitching suppressing control, and a right and left distribution control can individually be executed, where in the right and left distribution control, at least a front wheel braking differential pressure is generated between the wheel cylinder braking oil pressure corresponding to the left front wheel and the wheel cylinder braking oil pressure corresponding to the right front wheel based on a vehicle attitude by satisfying a right and left distribution control execution condition during the vehicle braking, and the right and left distribution control may be executed when the right and left distribution control execution condition is satisfied in executing one of the first pitching suppression control and the second pitching suppressing control.

Effect of the Invention

As described above, during the vehicle braking, the rate of increase of the wheel cylinder braking oil pressure is set less than a rate corresponding to the rate of increase of the master cylinder oil pressure from the time at which the braking oil pressure of the wheel cylinder reaches the predetermined threshold value. Therefore, during the vehicle braking, while the wheel cylinder braking oil pressure started up according to the master cylinder oil pressure, the braking is suppressed within a range where the excessive wheel slip or the increase of the braking distance is not generated, so that the vehicle braking can be optimized to maximally enhance the braking performance.

The braking oil pressure supplied to the wheel cylinder is increased, and a brake pad that is normally separated from a brake disc is driven and pressed against the brake disc, thereby performing the wheel braking. Therefore, in driving the brake pad, it is necessary to generate a flow of the brake oil in order to move the brake pad to eliminate a clearance for releasing the braking between the brake disc and the brake pad. Hereinafter, an integrating amount of the flow of the brake oil is referred to as "brake oil reducing amount". During the wheel braking, when the threshold value relating to the wheel cylinder braking oil pressure is the wheel cylinder braking oil pressure at which an increment of the wheel cylinder braking oil pressure and an increment of the brake oil consumption amount are started to be proportional to each other, the time point at which the wheel cylinder braking oil pressure reaches the threshold value becomes the proper timing in which the braking is optimized by adjustment of the braking power.

That the wheel cylinder braking oil pressure reaches the threshold value may directly be detected by providing an oil pressure sensor near the wheel cylinder. However, in the present vehicle power assist braking apparatus, a high-performance master cylinder oil pressure sensor is provided to actuate power assist means based on the master cylinder oil pressure. Therefore, when the wheel cylinder braking oil pressure estimates that the wheel cylinder braking oil pressure reaches the threshold value based on the master cylinder oil pressure, the threshold value can be adequately recognized without providing an additional sensor for detecting the threshold value.

At this point, it is assumed that tm1 is a time at which the master cylinder oil pressure reaches a predetermined first pressure in an braking initial stage in which the brake oil consumption amount is substantially proportional to the wheel cylinder braking oil pressure, it is assumed that tm3 is a time at which the master cylinder oil pressure reaches an oil pressure at which the increment of the brake oil reducing amount is started to be substantially proportional to the increment of the wheel cylinder braking oil pressure, and it is assumed that tm2 is a time at which the master cylinder oil pressure reaches an oil pressure at a boundary between a relationship in which the brake oil reducing amount is substantially proportional to the wheel cylinder braking oil pressure and a relationship in which the increment of the brake oil reducing amount is substantially proportional to the increment of the wheel cylinder braking oil pressure. When a time, at which a time value (tm2−tm1) multiplied by the predetermined first factor and a time value (tm3−tm2) multiplied by the predetermined second factor elapse from the time tm1, is estimated to be a time at which the wheel cylinder braking oil pressure reaches the threshold value, the delay of the increase of the wheel cylinder oil pressure with respect to the increase of the master cylinder oil pressure is adequately estimated based on a characteristic of the relationship between the wheel cylinder oil pressure and the brake oil reducing amount, and the sudden braking can be optimized.

Alternatively, when the wheel cylinder braking oil pressure sensor is provided, the wheel cylinder braking oil pressure reaching the threshold value can be estimated by directly detecting the wheel cylinder braking oil pressure.

When the sudden braking is performed to a degree of braking demand that is not lower than a predetermined degree of braking demand, the rate of increase of the wheel cylinder braking oil pressure is set smaller than a rate corresponding to the rate of increase of the master cylinder oil pressure from the time at which the braking oil pressure of the wheel cylinder reaches a predetermined threshold value. Therefore, the optimum actuation of the braking apparatus can be secured when the sudden braking is performed to the vehicle to possibly push the braking into the braking that is largely out of the optimum actuation. The determination of the degree of braking demand is made by the rate of increase of the master cylinder oil pressure when the wheel cylinder braking oil pressure reaches the threshold value estimated based on the master cylinder oil pressure. The determination of braking demand is made by the rate of increase of the wheel cylinder braking oil pressure when the wheel cylinder braking oil pressure reaches the threshold value estimated by directly detecting the wheel cylinder braking oil pressure. Therefore, the degree of sudden braking required for the vehicle by the driver can adequately be recognized, in order to execute the braking control, with a process of determining whether the wheel cylinder braking oil pressure reaches the threshold value.

Particularly, in executing the braking control to the wheel cylinder of the front wheel, the braking of the front wheel can adequately be controlled to maximally enhance the sudden braking performance of the vehicle, when the braking performance of the front wheel becomes important by largely moving the vertical load of the wheel from the rear wheel side to the front wheel side during the sudden braking of the vehicle.

EXPLANATIONS OF LETTERS OR NUMERALS

Figure 1:
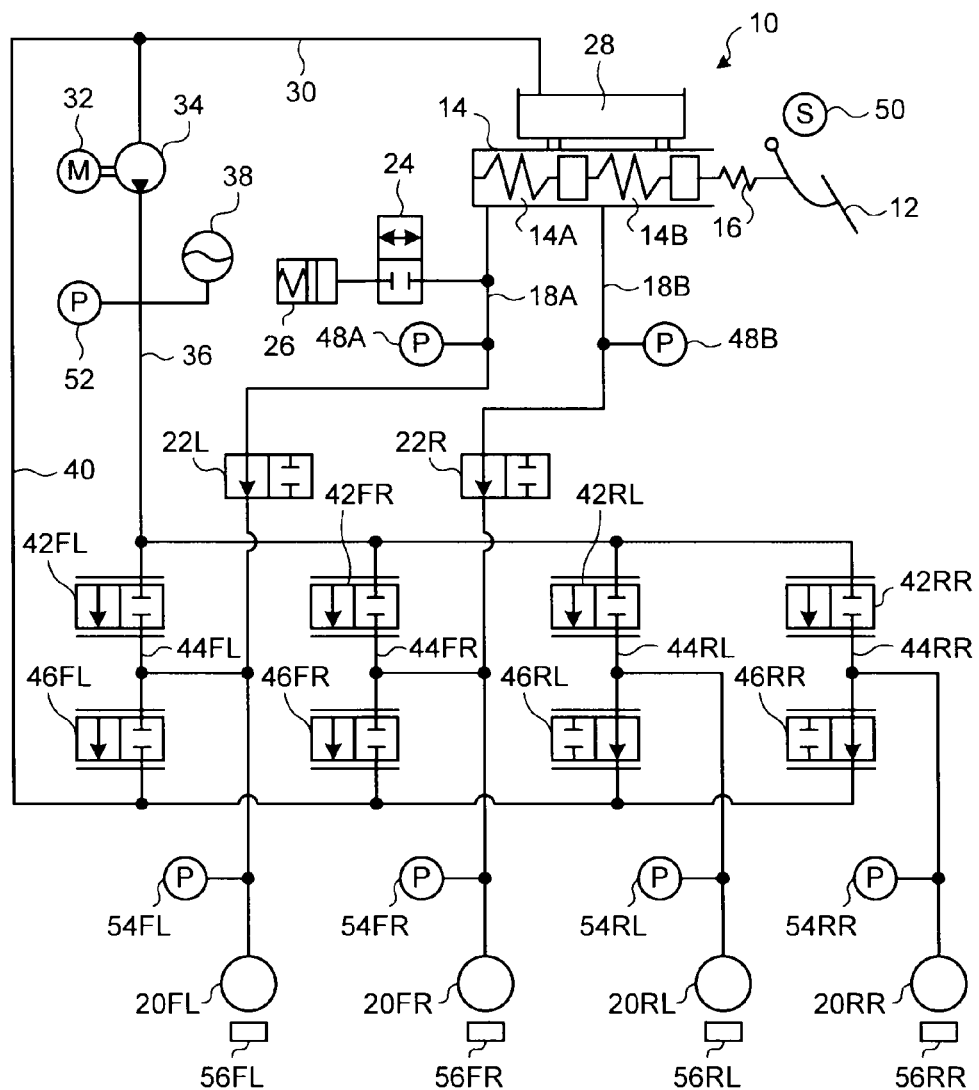
FIG. 1 is an oil pressure circuit diagram illustrating an example of a vehicle braking apparatus according to an embodiment of the present invention.

10 Braking apparatus
12 Brake pedal
14 Master cylinder

16 Dry stroke simulator
18A, 18B Oil pressure conduit
20FL, 20FR, 20RL, 20RR Wheel cylinder
22L, 22R Electromagnetic on-off valve
24 Electromagnetic on-off valve
26 Wet stroke simulator
28 Reservoir
30 Oil feed conduit
32 Motor
34 Oil pump
36 Oil pressure supply conduit
38 Accumulator
40 Oil return conduit
42FL, 42FR, 42RL, 42RR Electromagnetic on-off valve
44FL, 44FR, 44RL, 44RR Oil pressure conduit
46FL, 46FR, 46RL, 46RR Electromagnetic on-off valve
48A, 48B Oil pressure sensor
50 Stroke sensor
52 Oil pressure sensor
54FL, 54FR, 54RL, 54RR Oil pressure sensor
56FL, 56FR, 56RL, 56RR Wheel speed sensor
58 Electronic control unit
60 Microcomputer
62 Driving circuit

BEST MODE(S) FOR CARRYING OUT THE INVENTION

A vehicle braking apparatus according to an embodiment of the present invention that suppresses excessive slip of a wheel during the braking will be described below with reference to the drawings. However, the present invention is not limited to the embodiment.

First Embodiment

Figure 2:
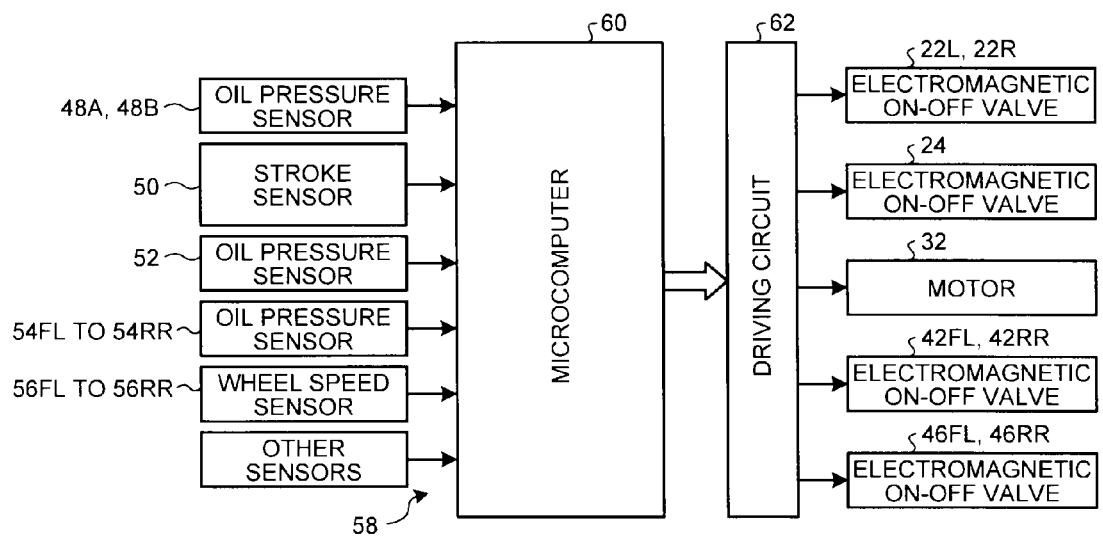
FIG. 2 is a view illustrating an example of an electronic control unit included in the vehicle braking apparatus of the embodiment.

A first embodiment of the present invention will be described below. FIG. 1 is an oil pressure circuit diagram illustrating an example of a vehicle braking apparatus according to a first embodiment of the present invention. FIG. 2 is a view illustrating an example of an electronic control unit included in the vehicle braking apparatus of the first embodiment. A braking apparatus 10 wholly illustrated includes a master cylinder 14 that pumps braking operating oil in response to a stepping-on operation of a brake pedal 12 by a driver. A dry stroke simulator 16 is provided between the brake pedal 12 and the master cylinder 14.

As illustrated in FIG. 1, the master cylinder 14 includes a first master cylinder chamber 14A and a second master cylinder chamber 14B, one end of a left front wheel oil pressure conduit 18A is connected to the first master cylinder chamber 14A, and one end of a right front wheel oil pressure conduit 18B is connected to the second master cylinder chamber 14B. In order to generate a braking power in each of the left front wheel and right front wheel, a wheel cylinder 20FL is connected to the other end of the oil pressure conduit 18A, and a wheel cylinder 20FR is connected to the other end of the oil pressure conduit 18B.

Normally opened type electromagnetic on-off valves (master cutoff valve) 22L and 22R are provided in the middle of the oil pressure conduits 18A and 18B, respectively. The electromagnetic on-off valves 22L and 22R act as cutoff valves that selectively cut communication between the first and second master cylinder chambers 14A and 14B and corresponding wheel cylinders 20FL and 20FR, respectively. A wet stroke simulator 26 is connected through a normally closed type electromagnetic on-off valve 24 to the brake oil pressure supply conduit 18A between the master cylinder 14 and the electromagnetic on-off valve 22L.

A reservoir 28 is connected to the master cylinder 14, and one end of an oil feed conduit 30 is connected to the reservoir 28. An oil pump 34 that is driven by a motor 32 is connected to the oil feed conduit 30, and an accumulator 38 in which an oil pressure is accumulated is connected to an oil pressure supply conduit 36 on an ejection side of the oil pump 34. One end of an oil return conduit 40 is connected to the oil feed conduit 30. The reservoir 28, the oil pump 34, and the accumulator 38 act as an oil pressure source that raises the pressures in the wheel cylinders 20FL, 20FR, 20RL, and 20RR.

Although not illustrated in FIG. 1, a conduit is provided to communicate the oil feed conduit 30 on an inlet side of the oil pump 34 and the oil pressure supply conduit 36 on the ejection side, and a relief valve is provided in the middle of the conduit. The relief valve is opened to return the oil to the oil feed conduit 30 on the inlet side from the oil pressure supply conduit 36 on the ejection side, when the pressure in the accumulator 38 exceeds a reference value.

The oil pressure supply conduit 36 on the ejection side of the oil pump 34 is connected to the wheel cylinder 20FL through a normally closed type electromagnetic on-off valve 42FL and an oil pressure conduit 44FL. Similarly the oil pressure supply conduit 36 on the ejection side of the oil pump 34 is connected to the wheel cylinder 20FR through a normally closed type electromagnetic on-off valve 42FR and an oil pressure conduit 44FR, connected to the wheel cylinder 20RL through a normally closed type electromagnetic on-off valve 42RL and an oil pressure conduit 44RL, and connected to the wheel cylinder 20RR through a normally closed type electromagnetic on-off valve 42RR and an oil pressure conduit 44RR.

The wheel cylinders 20FL, 20FR, 20RL, and 20RR are connected to oil pressure conduits 44FL, 44FR, 44RL, and 44RR and connected to the oil return conduit 40 through normally closed type electromagnetic on-off valves 46FL, 46FR, 46RL, and 46RR, respectively.

The electromagnetic on-off valves 42FL, 42FR, 42RL, and 42RR act as pressure rising valves (or oil pressure holding valves) with respect to the wheel cylinders 20FL, 20FR, 20RL, and 20RR, respectively. The electromagnetic on-off valves 46FL, 46FR, 46RL, and 46RR act as pressure reducing valves (or oil pressure holding valves) with respect to the wheel cylinders 20FL, 20FR, 20RL, and 20RR, respectively. The electromagnetic on-off valves 42FL to 42RR and 46FL to 46RR can separately boost or reduce the oil pressure supplied to the wheel cylinders 20FL to 20RR based on the oil pressure source in the accumulator 38 while being used in conjunction with one another.

The normally opened type electromagnetic on-off valves 22L and 22R is maintained in an opened state in a non-control mode in which a driving current is not supplied. The normally closed type electromagnetic on-off valves 42FL, 42FR, 42RL, and 42RR and 46FL, 46FR, 46RL, and 46RR are maintained in a closed state in the non-control mode in which the driving current is not supplied. When one of the electromagnetic on-off valves 42FL, 42FR, 42RL, and 42RR and 46FL, 46FR, 46RL, and 46RR breaks down, and are not able to normally control the pressure in the corresponding wheel cylinder, the electromagnetic on-off valves are set to the non-control mode, and therefore the master cylinder 14 directly controls the pressures in the wheel cylinders of the right and left front wheels.

A first oil pressure sensor 48A is provided in the oil pressure conduit 18A between the first master cylinder chamber 14A and the electromagnetic on-off valve 22L in order to detect the pressure in the oil pressure conduit as a first master cylinder oil pressure force. Similarly, a second oil pressure sensor 48B is provided in the oil pressure conduit 18B between the second master cylinder chamber 14B and the electromagnetic on-off valve 22R in order to detect the pressure in the oil pressure conduit as a second master cylinder oil pressure force. A stroke sensor 50 is provided in the brake pedal 12 in order to detect a stepping-on stroke of the brake pedal by the driver. An oil pressure sensor 52 is provided in the oil pressure supply conduit 36 on the ejection side of the oil pump 34 in order to detect the pressure in the conduit as an accumulator pressure. In the braking apparatus of FIG. 1, the pressures in the wheel cylinders 20FL, 20FR, 20RL, and 20RR are detected as a pressure Pwi (i=fl, fr, rl, and rr) by oil pressure sensors 54FL, 54FR, 54RL, and 54RR, respectively. However, in the control of the first embodiment, the oil pressure sensors 54FL, 54FR, 54RL, and 54RR need not be provided as long as the pressures in the wheel cylinders 20FL, 20FR, 20RL, and 20RR reach the threshold value that is estimated for the master cylinder oil pressure. Wheel speed sensors 56FL, 56FR, 56RL, and 56RR detect revolution speeds of the wheels as Vwi (i=fl, fr, rl, and rr). The configuration, particularly the configuration relating to various sensors is described as a general configuration of the oil pressure circuit in this kind of braking apparatus, but all the sensors do not relate to the first embodiment of the present invention.

As illustrated in FIG. 2, an electronic control unit 58 controls the electromagnetic on-off valves 22L and 22R, the electromagnetic on-off valve 24, the motor 32, the electromagnetic on-off valves 42FL to 42RR, and the electromagnetic on-off valves 46FL to 46RR. The electronic control unit 58 includes a microcomputer 60 and a driving circuit 62. Signals indicating first and second master cylinder oil pressures are supplied from the oil pressure sensors 48A and 48B to the microcomputer 60. A signal indicating the stepping-on stroke of the brake pedal 12 is supplied from the stroke sensor 50 to the microcomputer 60. A signal indicating the accumulator pressure is supplied from the oil pressure sensor 52 to the microcomputer 60. Signals indicating the pressure Pwi (i=fl, fr, rl, and rr) in the wheel cylinders 20FL to 20RR are supplied from the oil pressure sensors 54FL to 54RR to the microcomputer 60. Signals indicating the revolution speed Vwi (i=fl, fr, rl, and rr) are supplied from the wheel speed sensors 56FL, 56FR, 56RL, and 56RR to the microcomputer 60. Additionally, a signal indicating a vehicle speed is supplied from a vehicle speed sensor (not illustrated) to the microcomputer 60. A signal indicating a yaw rate of a vehicle body is supplied from a yaw rate sensor to the microcomputer 60. A signal indicating longitudinal acceleration of the vehicle body is supplied from a longitudinal acceleration sensor to the microcomputer 60. A signal indicating lateral acceleration of the vehicle body is supplied from a lateral acceleration sensor to the microcomputer 60.

A braking control routine is stored in the microcomputer 60. When the brake pedal 12 is stepped on, the microcomputer 60 closes the electromagnetic on-off valves 22L and 22R while opening the electromagnetic on-off valve 24. At this point, the microcomputer 60 computes a required braking power based on the master cylinder oil pressures detected by the oil pressure sensors 48A and 48B and the stepping-on stroke detected by the stroke sensor 50, and the microcomputer 60 computes a target wheel cylinder pressure Pwti (i=fl, fr, rl, and rr) with respect to the wheel cylinders 20FL to 20RR, whereby the microcomputer 60 controls the electromagnetic on-off valves 42FL to 42RR and 46FL to 46RR such that the wheel cylinder pressure Pwi (i=fl, fr, rl, and rr) becomes the target wheel cylinder pressure Pwti. The braking control of the first embodiment is executed as part of the usual power assist braking control.

Figure 3:
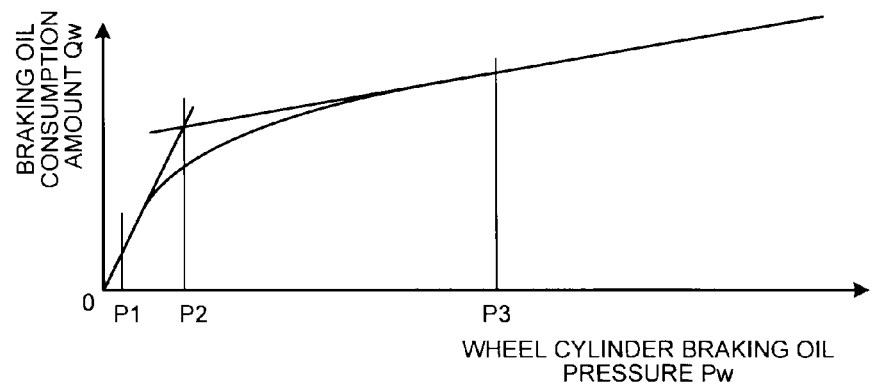
FIG. 3 is a view illustrating a relationship between a wheel cylinder braking oil pressure and a brake oil consumption amount.

When the brake oil is pumped toward the wheel cylinder from the braking oil pressure source such as the master cylinder and the oil pressure oil pump, the brake pad separated from the brake disc is driven toward the brake disc while the clearance between the brake pad and the brake disc is eliminated. At this point, a relationship between an integrating amount of the brake oil flowing toward the wheel cylinder, that is, the brake oil consumption amount Qw and the increase in corresponding wheel cylinder braking oil pressure Pw becomes as shown in FIG. 3. In the relationship between the brake oil reducing amount and the wheel cylinder braking oil pressure illustrated in FIG. 3, a steep gradient portion near an initial oil pressure P1 at which the clearance exists can be approximated by one straight line, and a moderate gradient portion from the oil pressure at which the clearance is substantially eliminated to press the brake pad against the brake disc can be approximated by one straight line. Therefore, the delay of the increase in wheel cylinder oil pressure with respect to the increase in master cylinder oil pressure is generated by the necessity for the flow of the brake oil corresponding to the brake oil reducing amount from the braking oil pressure source toward the wheel cylinder. Therefore, it is considered that the delay of the increase in wheel cylinder oil pressure with respect to the increase in master cylinder oil pressure can simply be estimated as the sum of values estimated by two linear functions corresponding to the two approximate straight lines. When the wheel is braked, the risk of generating the excessive slip of the wheel by the excessive deceleration or the load movement from the rear wheel to the front wheel to reduce the braking effect, is generated over an oil pressure P3 on the straight line by which the moderate gradient of the wheel cylinder braking oil pressure is approximated. During the braking, the wheel cylinder braking oil pressure is increased as quickly as possible according to the increase in master cylinder oil pressure until the wheel cylinder braking oil pressure reaches the oil pressure P3, and a rate of increase of the wheel cylinder braking oil pressure is properly suppressed such that an increase rate of the wheel cylinder braking oil pressure is decreased less than a rate corresponding to a rate of increase of the master cylinder oil pressure when wheel cylinder braking oil pressure is increased over the oil pressure P3. Therefore, it is considered that the braking performance can maximally be enhanced.

Figure 4:
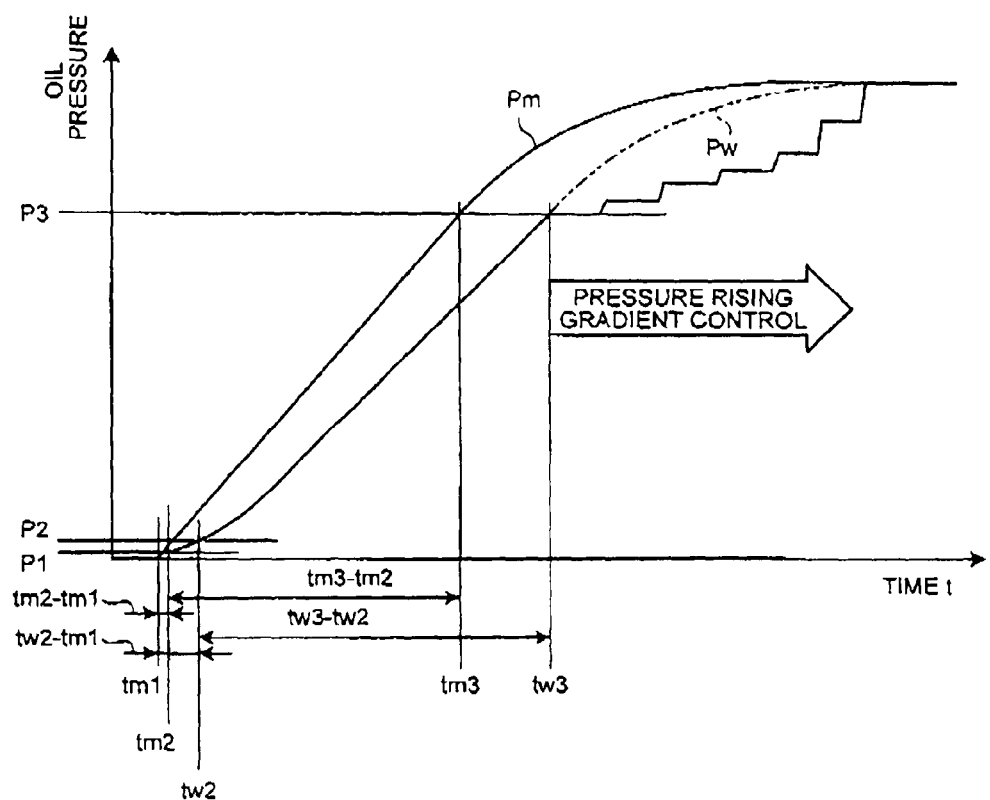
FIG. 4 is a view illustrating a mode in which a master cylinder oil pressure and the wheel cylinder braking oil pressure rise up in braking.

As illustrated in FIG. 1, in the power assist braking by the braking apparatus hardware, in consideration of the temporal delay of the increase in wheel cylinder braking oil pressure with respect to the increase in master cylinder oil pressure as illustrated in FIG. 4, the rate of increase of the wheel cylinder braking oil pressure is decreased from the rate corresponding to the rate of increase of the master cylinder oil pressure illustrated by an alternate long and two short dashes line from a time tw3 at which the wheel cylinder braking oil pressure Pw reaches the oil pressure P3, and the wheel cylinder braking oil pressure is moderately boosted in a stepwise manner as illustrated in a solid line. When the oil pressure sensors 54FL to 54RR are provided like the braking apparatus illustrated in FIG. 1, the oil pressure sensors 54FL to 54RR directly detect the wheel cylinder braking oil pressures. When the wheel cylinder braking oil pressure sensor is not provided, the wheel cylinder braking oil pressure may be estimated from the master cylinder oil pressure in the following procedure to determine that the wheel cylinder braking oil pressure Pw reaches the oil pressure P3.

It is assumed that the delay of the increase in wheel cylinder oil pressure with respect to the increase in master cylinder oil pressure is generated because of the necessity for the flow of the brake oil corresponding to the brake oil reducing amount from the braking oil pressure source toward the wheel cylinder, and it is assumed that the relationship between the brake oil reducing amount and the wheel cylinder braking oil pressure can be recognized by the combination of the one straight line by which the portion near the initial oil pressure P1 is approximate and the one straight line by which the portion after the oil pressure at which the brake pad is substantially pressed against the brake disc is approximated. At this point, the delay of the increase in wheel cylinder oil pressure with respect to the increase in master cylinder oil pressure can be recognized by the combination of the two straight lines and estimated as the sum of the values estimated by the two linear functions based on the master cylinder oil pressure. FIG. 4 illustrates an estimation procedure. It is assumed that P2 is an oil pressure at a point at which the straight line having the steep gradient near the oil pressure P1 of FIG. 3 and the straight line having the moderate gradient in the region over the oil pressure P3 intersect each other, and it is assumed that tm1, tm2, and tm3 are times at which the master cylinder oil pressure Pm becomes oil pressures P1, P2, and P3, respectively. On the other hand it is assumed that tw1, tw2, and tw3 are times at which the wheel cylinder braking oil pressure Pw becomes oil pressures P1, P2, and P3, respectively. Assuming that tw1 is a time at which the wheel cylinder braking oil pressure Pw becomes the oil pressure P1, the time tw1 is slightly delayed from the time tm1. However, because the pressure P1 is the extremely low initial value used to confirm the braking start, the difference between the time tw1 and the time tm1 is omitted, and it is assumed that the time at which the wheel cylinder braking oil pressure Pw becomes the oil pressure P1 is identical to the time tm1. When the oil pressure P1 is decreased to the limit of zero, the time tw1 is matched with the time tm1. However, when the oil pressure P1 is set to zero, the time tm1 cannot be specified. Because the phenomenon of the delay of the wheel cylinder braking oil pressure with respect to the master cylinder oil pressure is generated based on the relationship between brake oil consumption amount and the wheel cylinder braking oil pressure as illustrated in FIG. 3, the following relationships hold, and it is believed that K12 and K23 substantially become unique constants in the braking apparatus.

$$(tw2-tm1)/(tm2-tm1)=K12$$

$$(tw3-tw2)/(tm3-tm2)=K23$$

Therefore, when the times tm1, tm2, and tm3 at which the master cylinder oil pressure Pm becomes the oil pressures P1, P2, and P3 are detected, the time tw3 is estimated as follow.

$$tw2=tm1+K12(tm2-tm1)$$

$$tw3=tw2+K23(tm3-tm2)=tm1+K12(tm2-tm1)+K23(tm3-tm2)$$

Figure 5:
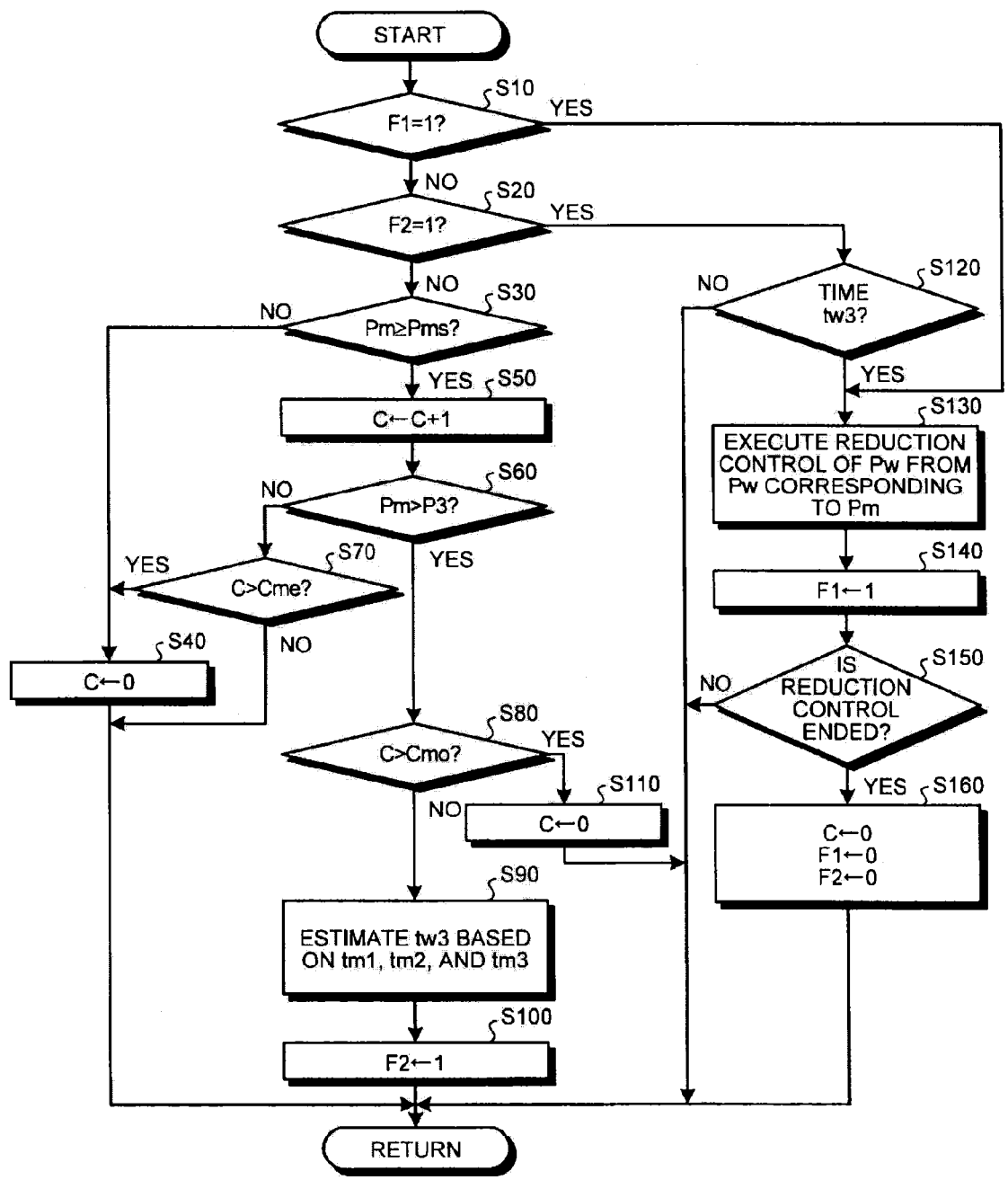
FIG. 5 is a flowchart illustrating actuation of the vehicle braking apparatus of the embodiment that is actuated by estimating a time at which a master cylinder braking oil pressure reaches a threshold value based on the wheel cylinder braking oil pressure.

An actuation control of the vehicle braking apparatus of the first embodiment will be described below. FIG. 5 is a flowchart illustrating the actuation control of the vehicle braking apparatus of the first embodiment that is applied to, particularly the case where the vehicle braking is performed over a sudden degree exceeding a predetermined degree. The microcomputer 60 illustrated in FIG. 2 may repeatedly perform the control computation along the flowchart at time intervals of several milliseconds to tens of milliseconds during the vehicle driving, meanwhile the times tm1, tm2, and tm3 at which the master cylinder oil pressure Pm becomes the oil pressures P1, P2, and P3 are detected.

When the control is started, a determination whether a flag F1 is set to 1 is made in Step (S) 10. The flag F1 is reset to 0 at the beginning of the control, the flag F1 is set to 1 when the control reaches Step 140 described below, and the flag F1 is reset to 0 when the control reaches Step 160 described below. Therefore, the negative determination is made in Step 10, and the control goes to Step 20. A determination whether a flag F2 is set to 1 is made in Step 20. The flag F2 is reset to 0 at the beginning of the control, the flag F2 is set to 1 when the control reaches Step 100 described below, and the flag F2 is reset to 0 when the control reaches Step 160 described below. Therefore, the negative determination is made in Step 20, and the control goes to Step 30.

A determination whether the master cylinder oil pressure Pm is increased not lower than a certain small limit value Pms enough to start the braking is made in Step 30. For example, the limit value Pms may be set to the oil pressure P1. When the negative determination is made in Step 30, because the control of the first embodiment is not further performed, the control goes to Step 40, a count value C of a counter that is partially incorporated in the microcomputer 60 is set to 0, and the control of this time is ended. Because the count value C is also reset to 0 at the beginning of the control, the count value C is originally reset to 0 when the control goes directly from Step 30 to Step 40 after the control is started. When the affirmative determination is made in Step 30, the control goes to Step 50.

In Step 50, the count value C of the counter is incremented by 1. Then the control goes to Step 60 to make a determination whether the master cylinder oil pressure Pm exceeds the oil pressure P3. The negative determination is initially made in Step 60 irrespective of the rate of increase of the master cylinder oil pressure, and the control goes to Step 70 to make a determination whether the count value C exceeds a relatively large setting value Cme. The setting value Cme is a proper value that is used to confirm that the state in which the master cylinder oil pressure Pm is increased not lower than the limit value Pms enough to start the braking is the state in which the master cylinder oil pressure Pm does not reach the oil pressure P3 yet, irrespective of the continuity of a time CmeΔt in which a repetition period Δt of the control of the flowchart illustrated in FIG. 5 is multiplied by the setting value Cme, that is, the braking is not the sudden braking. In the first embodiment, when the affirmative determination is made in Step 70, that is, when the braking is not the sudden braking, a determination that the braking control is not executed is made, and the control goes to Step 40 to reset the count value C to 0, and the control is returned to the initial state. On the other hand, when the negative determination is made in Step 70, the control is returned while the count value C is incremented.

When the affirmative determination is made in Step 60, the control goes to Step 80 to make a determination whether the count value C exceeds a predetermined setting value Cmo. The setting value Cmo is a value that is used to confirm that the braking is the sudden braking that should become the target of the braking control of the first embodiment because the time until the master cylinder oil pressure Pm exceeds the oil pressure P3 does not exceed a time CmoΔt. When the negative determination is made in Step 80, that is, the current braking is the sudden braking that should become the target of the braking control of the first embodiment, the control goes to Step 90 to estimate the time tw3 at which the wheel cylinder braking oil pressure Pw reaches the oil pressure P3 based on the times tm1, tm2, and tm3 at which the master cylinder oil pressure Pm reaches the oil pressures P1, P2, and P3 in the procedure illustrated in FIG. 4. Then the control goes to Step 100 to set the flag F2 to 1. When the affirmative determination is made in Step 80, that is, when the elapsed time already exceeds the time CmoΔt although the master cylinder oil pressure Pm reaches the oil pressure P3, because the braking is not the sudden braking that should become the target of the braking control of the first embodiment, the control goes to Step 110 to reset the count value C to 0, and the control is returned to the initial state. After the flag F2 is set to 1, the control goes from Step 20 to Step 120.

A determination whether the braking control system reaches the time tw3 estimated in Step 90 is made in Step 120. When the negative determination is made in Step 120, the control is returned to repeat the flow through Step 120. When the affirmative determination is made in Step 120, the control goes to Step 130, and the control in which the wheel cylinder braking oil pressure is reduced lower than the wheel cylinder braking oil pressure corresponding to the master cylinder oil pressure is executed such that the alternate long and two short dashes line portion of the wheel cylinder braking oil pressure illustrated in FIG. 4 is changed to the stepwise solid line portion. For example, the oil pressure reduction control may be executed for a predetermined time of 200 milliseconds from the start. After the control in Step 130 is executed, the control goes to Step 140 to set the flag F1 to 1, and a determination whether the oil pressure reduction control is ended is monitored in Step 150, and the control goes directly from Step 10 to Step 130 to wait for the end of the oil pressure reduction control. When the time at which the oil pressure reduction control should be ended comes, the oil pressure reduction control is ended. When the affirmative determination is made in Step 150, the control goes to Step 160, the count value C, the flag F1, and the flag F2 are reset to 0, and the control is returned to the initial state.

Figure 6:
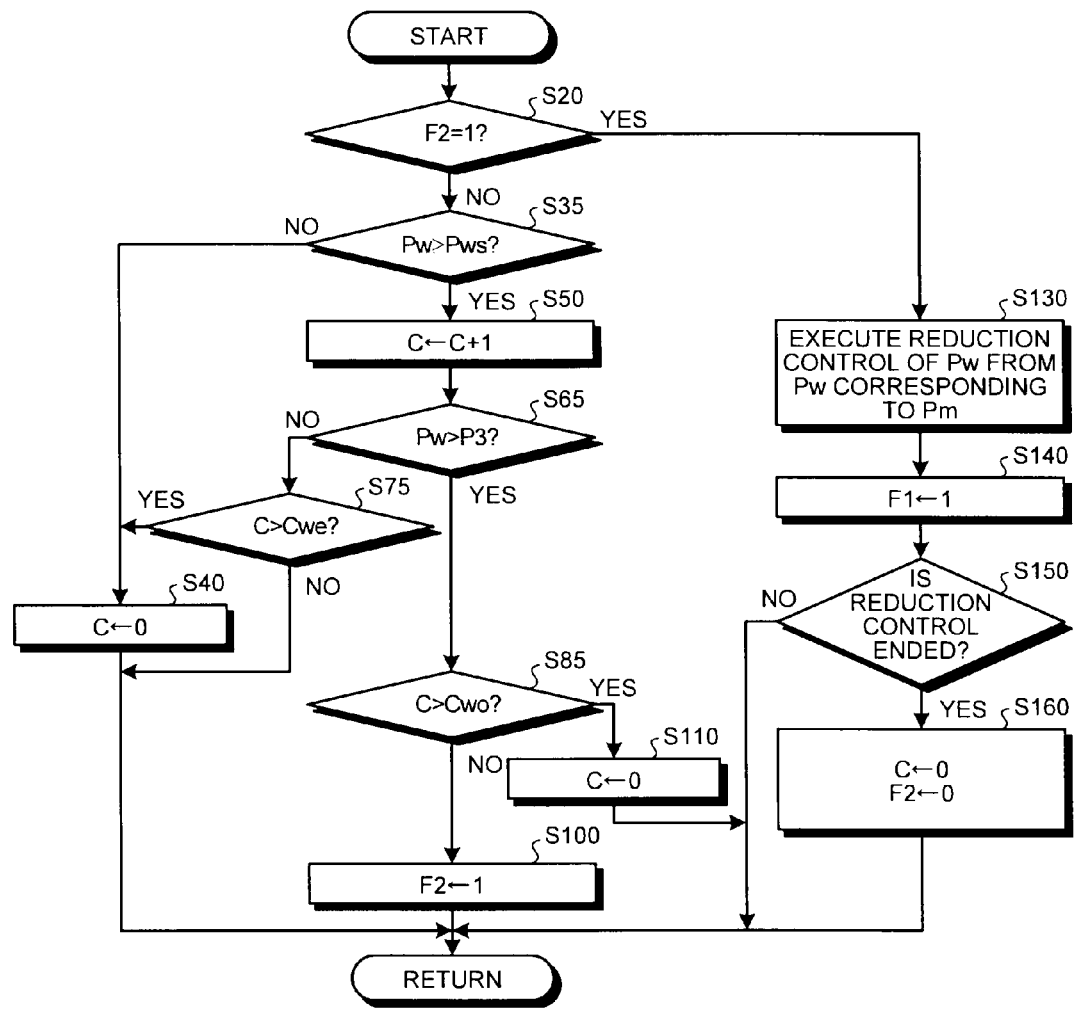
FIG. 6 is a flowchart illustrating actuation of the vehicle braking apparatus of the embodiment that is actuated by directly detecting a time at which the wheel cylinder braking oil pressure reaches a threshold value.

As illustrated in FIG. 4, the braking control of the flowchart illustrated in FIG. 5 is executed by estimating the time tw3 at which the wheel cylinder braking oil pressure reaches the oil pressure P3 from the time tm1, tm2, and tm3 at which the master cylinder oil pressure reaches the oil pressures P1, P2, and P3. However, when the sensor that directly detects the braking oil pressure of the wheel cylinder like the braking apparatus illustrated in FIG. 1 is provided, because the time tw3 at which the wheel cylinder braking oil pressure reach the oil pressure P3 is directly obtained by the sensor, the control illustrated in FIG. 5 is simplified as illustrated in FIG. 6. In FIG. 6, the same step as the step illustrated in FIG. 5 is designated by the same step number, and the step that is not identical but corresponds to the step illustrated in FIG. 5 is designated by the step number larger than that of FIG. 5.

In FIG. 6, a setting value Cwe is a proper value that is used to confirm that the braking is not the sudden braking because the wheel cylinder braking oil pressure Pw does not reach the oil pressure P3, yet irrespective of continuity of a time CweΔt in which a repetition period Δt of the control of the flowchart illustrated in FIG. 6 is multiplied by the setting value Cwe. A setting value Cwo is a value that is used to confirm that the braking is the sudden braking that becomes the target of the braking control because the time until the wheel cylinder braking oil pressure Pw exceeds the oil pressure P3 does not exceed a time CwoΔt.

Because the control illustrated in FIG. 6 is clear by the supplemental explanation in addition to the description of FIG. 5, the further overlapping explanation of the control illustrated in FIG. 6 is omitted.

Second Embodiment

A second embodiment of the present invention will be described below. A vehicle braking apparatus according to a second embodiment of the present invention differs from the vehicle braking apparatus of first embodiment in that the control is performed such that the rate of increase of the wheel cylinder braking oil pressure corresponding to the front wheel is decreased less than a rate corresponding to the rate of increase of the master cylinder oil pressure, that is, a pitching suppressing control (reduction control of the first embodiment) is executed when one of two different pitching suppressing control execution conditions is satisfied. Hereinafter, the pitching suppressing controls executed in the different pitching suppressing control execution conditions are referred to as a first pitching suppressing control and second pitching suppressing control. Because the basic configuration of the vehicle braking apparatus of the second embodiment is substantially identical to that of the vehicle braking apparatus of the first embodiment, the description is omitted.

A pitching suppressing control execution condition (hereinafter simply referred to as "first control execution condition") in the first pitching suppressing control is that the wheel cylinder braking oil pressure of the front wheel reaches a predetermined threshold value during the vehicle braking. In the second embodiment, the first control execution condition is satisfied, when the master cylinder oil pressure Pm becomes not lower than the oil pressure P3 (for example, about 6.0 MPa) that is of the predetermined threshold value, when the vehicle braking apparatus is in the sudden stepping-on state, and when the wheel cylinder braking oil pressure Pw corresponding to the front wheel becomes not lower than the oil pressure P3. At this point, a determination whether the vehicle braking apparatus is in the sudden stepping-on state is made based on the master cylinder oil pressure. Specifically, the determination whether the vehicle braking apparatus is in the sudden stepping-on state is made based on the change in master cylinder oil pressure Pm until the time tm3 at which the master cylinder oil pressure Pm reaches the oil pressure P3 that is of the predetermined threshold value during the vehicle braking. For example, the determination that the vehicle braking apparatus is in the sudden stepping-on state is made, when a time between the time tm3 and a time tm4 (at which the master cylinder oil pressure Pm reaches a first sudden stepping-on state determination pressure (for example, about 4 MPa)) is equal to or lower than a first sudden stepping-on state determination time, and when a time between a time tm6 (at which the master cylinder oil pressure Pm reaches a third sudden stepping-on state determination pressure (for example, about 5.5 MPa)) and a time tm5 (at which the master cylinder oil pressure Pm reaches a second sudden stepping-on state determination pressure (for example, about 4.5 MPa)) is equal to or lower than a second sudden stepping-on state determination time. Similarly to the first embodiment, the determination of the sudden stepping-on state may be made when the count value C (count value from the time tm1 to the time tm3) is the setting value Cme or less.

A pitching suppressing control execution condition (hereinafter simply referred to as "second control execution condition") in the second pitching suppressing control is that the master cylinder oil pressure reaches a control execution pressure while the first pitching suppression control is not executed during the vehicle braking and that a value related to the change in master cylinder oil pressure reaches the control execution pressure, that is, it is in an increased stepping-on state. In the second embodiment, the second control execution condition is satisfied, when the vehicle braking apparatus is not in the sudden steeping-on state, when the master cylinder oil pressure Pm becomes not lower than the oil pressure P3 that is of the control execution pressure, and when it is in the increased stepping-on state, that is when a differential value ΔPm of the master cylinder oil pressure Pm that is of the value related to the change in master cylinder oil pressure Pm exceeds a control execution value ΔP4. At this point, in the second embodiment, a determination whether the vehicle braking apparatus is in the increased steeping-on state is made based on whether the master cylinder oil pressure reaches the control execution pressure, that is, whether the master cylinder oil pressure Pm reaches the oil pressure P3. The control execution value ΔP4 is a value by which the determination whether it is in the sudden stepping-on state can be made while the master cylinder oil pressure Pm reaches the oil pressure P3. For example, the control execution value ΔP4 is set to about 20 MPa/s. In the second embodiment, the control execution pressure is set to the oil pressure P3 that is identical to the predetermined threshold value. However, the present invention is not limited to the second embodiment, but the control execution pressure may be set to a value larger than the predetermined threshold value.

Figure 7:
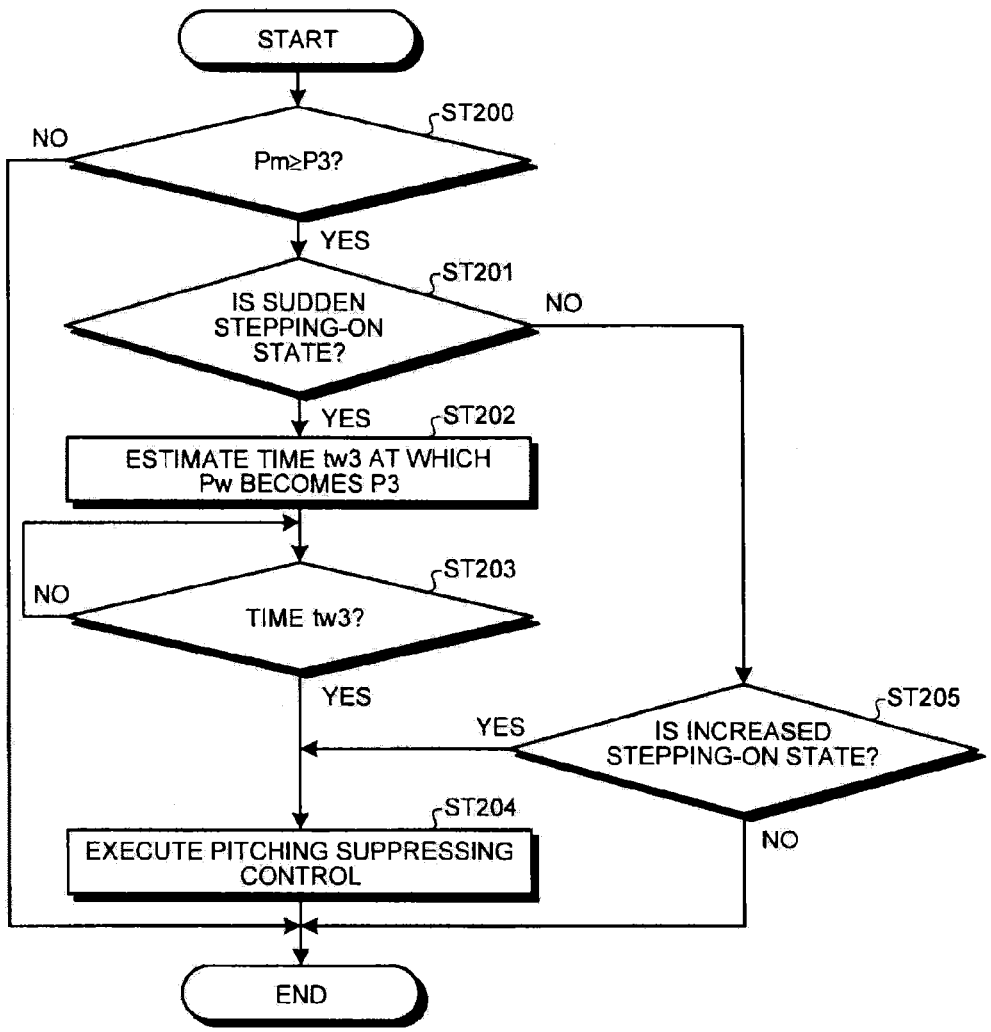
FIG. 7 is a flowchart illustrating actuation of a vehicle braking apparatus according to a second embodiment of the present invention.
Figure 8:
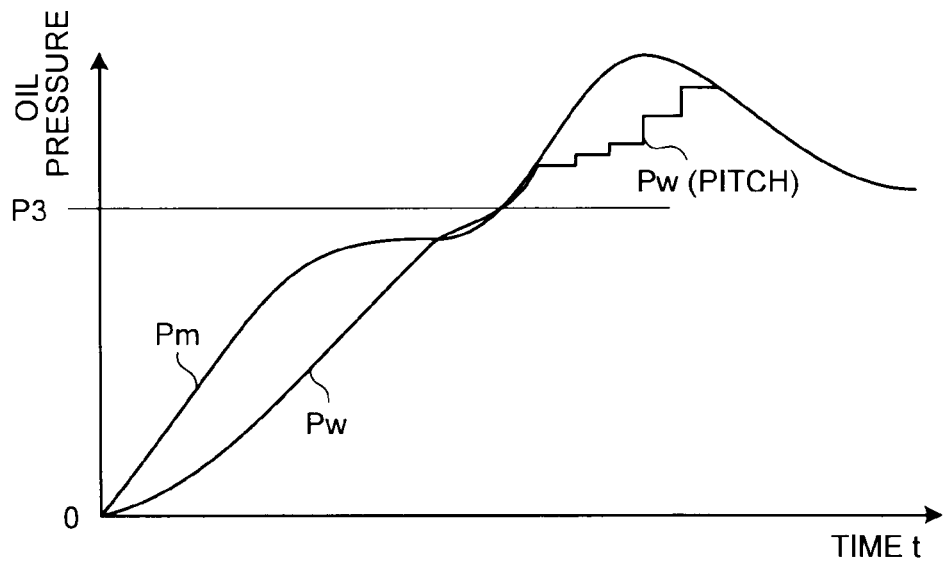
FIG. 8 is a view illustrating a relationship between a master cylinder oil pressure and a wheel cylinder braking oil pressure.

The actuation control of the vehicle braking apparatus of the second embodiment will be described below. FIG. 7 is a flowchart illustrating the actuation of the vehicle braking apparatus of the second embodiment. FIG. 8 is a view illustrating a relationship between the master cylinder oil pressure and the wheel cylinder braking oil pressure corresponding to the front wheel. The microcomputer 60 illustrated in FIG. 2 may repeatedly perform the control computation along the flowchart illustrated in FIG. 7 at time intervals of several milliseconds to tens of milliseconds during the vehicle driving, meanwhile the times tm1, tm2, and tm3 at which the master cylinder oil pressure Pm becomes the oil pressures P1, P2, and P3 are detected.

As illustrated in FIG. 7, the microcomputer 60 determines whether the master cylinder oil pressure Pm becomes not lower than the oil pressure P3 (Step ST200). Specifically, the microcomputer 60 determines whether one of the first control execution conditions is satisfied, that is, whether the master cylinder oil pressure Pm reaches the predetermined threshold value, and the microcomputer 60 determines whether one of the second control execution conditions is satisfied, that is, whether the master cylinder oil pressure Pm reaches the oil pressure P3.

When determining that the master cylinder oil pressure Pm is not lower than the oil pressure P3 (Yes in Step ST200), the microcomputer 60 determines whether it is in the sudden stepping-on state (Step ST201). Specifically, when the microcomputer 60 determines that one of the first pitching suppressing control and second control execution conditions is satisfied, that is, the master cylinder oil pressure Pm reaches the oil pressure P3, the microcomputer 60 determines that one of the first control execution conditions is satisfied, that is, it is in the sudden stepping-on state, or the microcomputer 60 determines whether one of the second control execution conditions is satisfied, that is, whether it is not in the sudden stepping-on state. When determining that the master cylinder oil pressure Pm is lower than the oil pressure P3 (No in Step ST200), the microcomputer 60 repeats Step ST200 until the master cylinder oil pressure Pm becomes not lower than the oil pressure P3.

When determined that it is in the sudden stepping-on state (Yes in Step ST201), the microcomputer 60 estimates the time tw3 at which the wheel cylinder braking oil pressure Pw corresponding to the front wheel becomes the oil pressure P3 (Step ST202). Specifically, when one of the first control execution conditions is satisfied, that is, when it is in the sudden stepping-on state, the microcomputer 60 estimates the time point tw3 at which the wheel cylinder braking oil pressure Pw corresponding to the front wheel reaches the oil pressure P3 based on the master cylinder oil pressure Pm. Similarly to the first embodiment, the time tw3 is estimated based on the times tm1, tm2, and tm3 at which the master cylinder oil pressure Pm reaches the P1, P2, and P3.

Then the microcomputer 60 determines whether the vehicle braking apparatus becomes the estimated time tw3 (Step ST203). Specifically, the microcomputer 60 determines whether one of the first control execution conditions is satisfied, that is, whether the wheel cylinder braking oil pressure Pw corresponding to the front wheel becomes not lower than the oil pressure P3.

When determining that the vehicle braking apparatus becomes the estimated time tw3 (Yes in Step ST203), the microcomputer 60 executes the pitching suppressing control (Step ST204). That is, the microcomputer 60 executes the first pitching suppressing control in which the pitching suppressing control is executed by satisfying the first control execution condition. As illustrated in FIG. 4, similarly to the first embodiment, the pitching suppressing control is a control in which the wheel cylinder braking oil pressure Pw corresponding to the front wheel is reduced lower than the wheel cylinder braking oil pressure Pw corresponding to the front wheel according to the master cylinder oil pressure Pm (hereinafter simply referred to as "pressure rising of the wheel cylinder braking oil pressure Pw corresponding to the front wheel is reduced") such that the alternate long and short dashes line portion of the wheel cylinder braking oil pressure Pw corresponding to the front wheel is changed to the stepwise solid-line portion. The pitching suppressing control is executed until a pitching suppressing control end condition is satisfied. When determining that the vehicle braking apparatus does not become the estimated time tw3 (No in Step ST203), the microcomputer 60 repeats Step ST203 until the vehicle braking apparatus becomes the estimated time tw3.

As illustrated in FIG. 7, when determining that it is not in the sudden stepping-on state (No in Step ST201), the microcomputer 60 determines whether it is in the increased stepping-on state (Step ST205). Specifically, when one of the second control execution conditions is satisfied, that is, when it is not in the sudden stepping-on state, the microcomputer 60 determines whether one of the second control execution condition is satisfied, that is, whether it is in the increased stepping-on state. That is, the microcomputer 60 determines whether the differential value ΔPm of the master cylinder oil pressure Pm exceeds a control execution value ΔP4 while the master cylinder oil pressure Pm reaches the oil pressure P3.

When determining that it is in the increased stepping-on state (Yes in Step ST205), the microcomputer 60 executes the pitching suppressing control (Step ST204). That is, the microcomputer 60 executes the second pitching suppressing control in which the pitching suppressing control is executed by satisfying the second control execution condition. As illustrated in FIG. 8, the pitching suppressing control is a control in which the pressure rising of the wheel cylinder braking oil pressure Pw corresponding to the front wheel is reduced (for example, the wheel cylinder braking oil pressure Pw corresponding to the front wheel is changed so as to rise in the stepwise manner) when the differential value ΔPm exceeds the control execution value ΔP4 while the master cylinder oil pressure Pm becomes not lower than the oil pressure P3. The pitching suppressing control is executed until a pitching suppressing control end condition is satisfied (Pw (pitch) portion illustrated in FIG. 8). When determining that the differential value ΔPm is equal to or lower than the control execution value ΔP4 (No in Step ST205), the microcomputer 60 repeats Step ST205 until the differential value ΔPm exceeds the control execution value ΔP4.

As described above, in the vehicle braking apparatus of the second embodiment, the first pitching suppressing control is preferentially executed when the first pitching suppressing control can be executed, and the second pitching suppressing control is executed when the first pitching suppressing control is not executed. That is, in the vehicle braking apparatus of the second embodiment, the pitching suppressing control is executed even if the first pitching suppressing control is not executed. Accordingly, even if it becomes the increased stepping-on state from the state in which the driver performs the stepping on operation on the brake pedal 12, when the master cylinder oil pressure Pm reaches the control execution oil pressure P3 during the vehicle braking, the rate of increase of the wheel cylinder braking oil pressure Pw corresponding to the front wheel is decreased less than a rate corresponding to the rate of increase of the master cylinder oil pressure Pm, and the rear wheel lift-up caused by the rapid increase in wheel cylinder braking oil pressure Pw corresponding to the front wheel can be suppressed while the wheel cylinder braking oil pressure Pw corresponding to the front wheel is started up according to the master cylinder oil pressure Pm during the vehicle braking. Therefore, the braking can be suppressed within the range where the excess wheel slip or the increase in braking distance is not generated, and the vehicle braking can be optimized to maximally enhance the braking performance.

In the vehicle braking apparatus of the second embodiment, that the state in which the master cylinder oil pressure Pm is not lower than the oil pressure P3 is continued for a predetermined time may be added to the first control execution condition. In such cases, the predetermined time is set based on the change in master cylinder oil pressure Pm from a first predetermined time determination pressure (for example, about 4 MPa) to a second predetermined time determination pressure (for example, about 6 MPa). The delay time between the time tw3 (at which the wheel cylinder braking oil pressure Pw corresponding to the front wheel reaches the oil pressure P3 that is of the predetermined threshold value) and the time tm3 (at which the master cylinder oil pressure Pm reaches the oil pressure P3 that is of the predetermined threshold value during the vehicle braking) is equal to or lower than a predetermined delay time, may be added to the first control execution condition. That is, the pitching suppressing control needs not to be executed, when the sudden braking is possibly ended at the time tw3, at which the wheel cylinder braking oil pressure Pw corresponding to the front wheel reaches the oil pressure P3 that is of the predetermined threshold value because of the long delay time.

Figure 9:
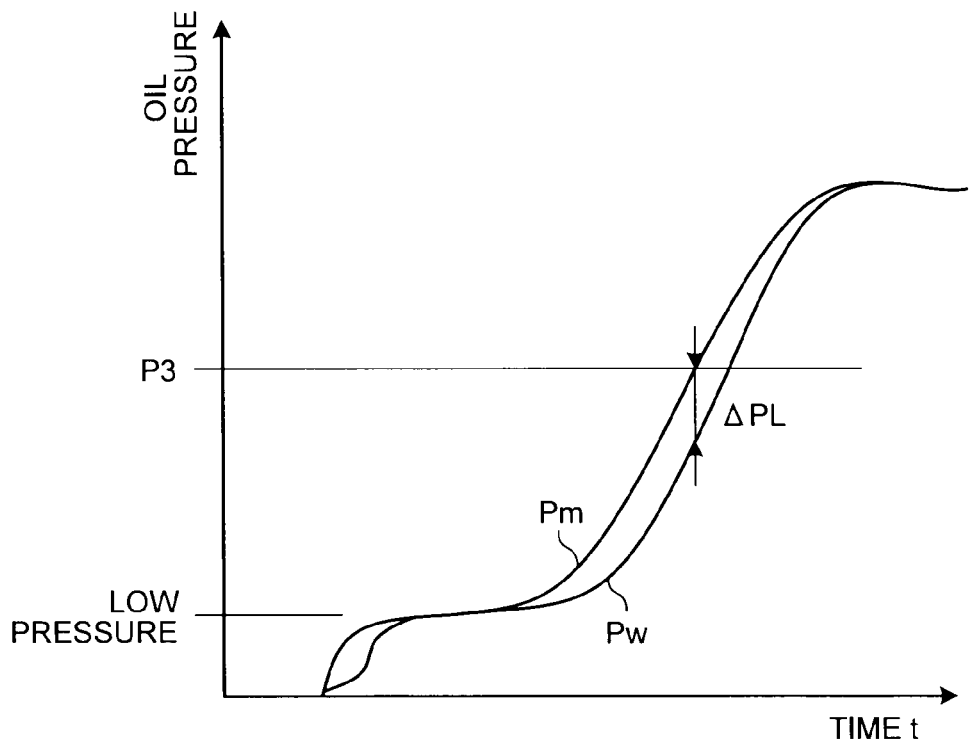
FIG. 9 is a view illustrating the relationship between the master cylinder oil pressure and the wheel cylinder braking oil pressure when a driver operates increased stepping-on from a low pressure.
Figure 10:
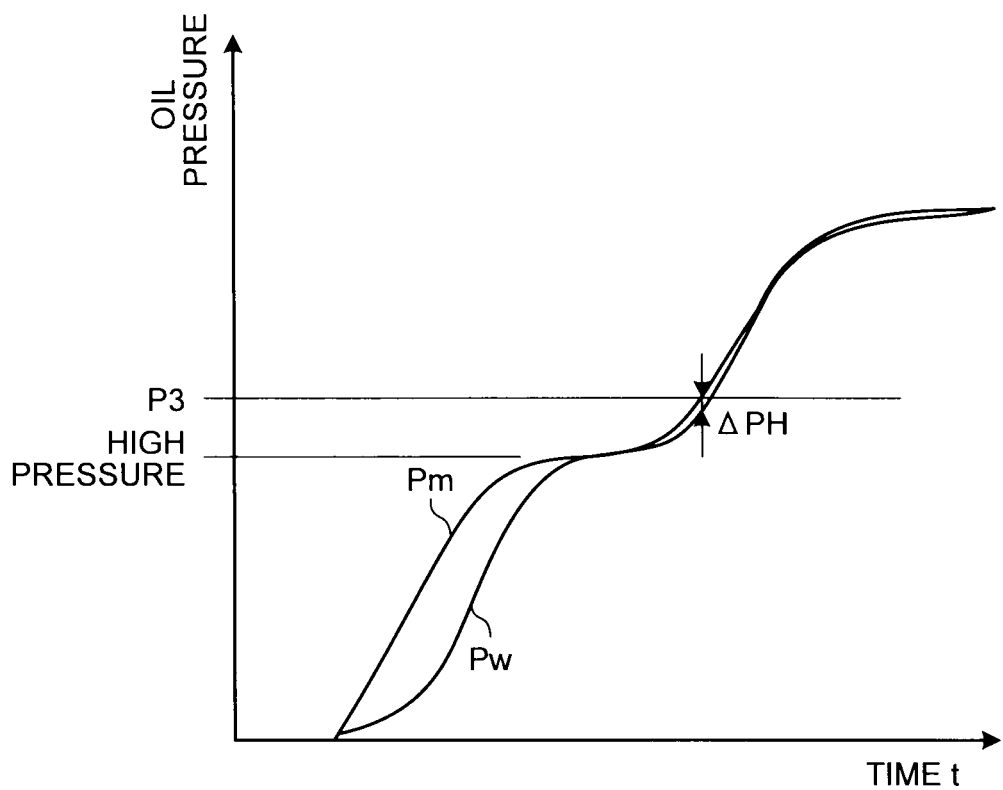
FIG. 10 is a view illustrating the relationship between the master cylinder oil pressure and the wheel cylinder braking oil pressure when a driver operates increased stepping-on from a high pressure.

In the vehicle braking apparatus of the second embodiment, the determination whether it is in the increased stepping-on state that is one of the second control execution conditions is made based on whether the differential value ΔPm of the master cylinder oil pressure Pm exceeds the control execution value ΔP4 while the master cylinder oil pressure reaches the control execution pressure, that is, while the master cylinder oil pressure Pm reaches the oil pressure P3. However, the present invention is not limited to the second embodiment. For example, the determination whether it is in the increased stepping-on state is made based on whether the differential value ΔPm of the master cylinder oil pressure Pm exceeds the control execution value ΔP4 before the master cylinder oil pressure reaches the control execution pressure. In such cases, when determining that the master cylinder oil pressure Pm is not lower than the oil pressure P3, the microcomputer 60 determines whether the differential value ΔPm of the master cylinder oil pressure Pm exceeds the control execution value ΔP4 while the master cylinder oil pressure Pm reaches an increased stepping-on determination pressure P5 smaller than the control execution pressure, thereby determining whether it is in the increased stepping-on state. FIG. 9 is a view illustrating a relationship between the master cylinder oil pressure and the wheel cylinder braking oil pressure corresponding to the front wheel when the driver operates the increased stepping-on from the low pressure. FIG. 10 is a view illustrating a relationship between the master cylinder oil pressure and the wheel cylinder braking oil pressure corresponding to the front wheel when the driver operates the increased stepping-on from the high pressure. As illustrated in FIG. 9, when the driver operates the increased stepping-on at the low pressure of the master cylinder oil pressure Pm while the driver steps on the brake pedal 12, a differential pressure ΔPL is generated between the master cylinder oil pressure Pm at the time point at which the master cylinder oil pressure Pm reaches the control execution oil pressure P3 and the wheel cylinder braking oil pressure Pw corresponding to the front wheel. On the other hand, as illustrated in FIG. 10, when the driver operates the increased stepping-on at the high pressure of the master cylinder oil pressure Pm while the driver steps on the brake pedal 12, a differential pressure ΔPH smaller than the differential pressure ΔPL is obtained between the master cylinder oil pressure Pm at the time point at which the master cylinder oil pressure Pm reaches the control execution oil pressure P3 and the wheel cylinder braking oil pressure Pw corresponding to the front wheel. The differential pressure ΔPH is smaller than the differential pressure ΔPL that is generated in operating the increased stepping-on at the low pressure of the master cylinder oil pressure Pm. That is, when the driver operates the increased stepping-on at the low pressure of the master cylinder oil pressure Pm, the wheel cylinder braking oil pressure Pw corresponding to the front wheel at the time at which the master cylinder oil pressure Pm reaches the control execution oil pressure P3 is reduced smaller than the case where the driver operates the increased stepping-on at the high pressure of the master cylinder oil pressure Pm. In the second pitching suppressing control, preferably the driver operates the increased stepping-on at the high pressure of the master cylinder oil pressure Pm in order not to reduce the wheel cylinder braking oil pressure Pw corresponding to the front wheel in executing the pitching suppressing control. Accordingly, the increased stepping-on determination pressure P5 is set to a value, in which the execution of the pitching suppressing control can be suppressed at the wheel cylinder braking oil pressure of the front wheel at which the rear wheel lift-up is not generated by satisfying the second control execution condition to execute the pitching suppressing control. For example, the increased stepping-on determination pressure P5 is set to about 4 MPa based on the specification of the vehicle braking apparatus.

Third Embodiment

A third embodiment of the present invention will be described below. A vehicle braking apparatus according to a third embodiment of the present invention differs from the vehicle braking apparatus of the first and second embodiments in that not only the pitching suppressing control (including the case in which the pitching suppressing control execution conditions differs from each other like the second embodiment) but also a brake assist control and a right and left distribution control can be executed. Because the basic configuration of the vehicle braking apparatus of the third embodiment is substantially identical to that of the vehicle braking apparatus of the first embodiment, the description is omitted.

The pitching suppressing control of the third embodiment is similar to that executed by the vehicle braking apparatus of the first embodiment and that executed by the vehicle braking apparatus of the second embodiment. In the pitching suppressing control, the rate of increase of the wheel cylinder braking oil pressure Pw corresponding to the front wheel is decreased less than a rate corresponding to the rate of increase of the master cylinder oil pressure Pm by satisfying the pitching suppressing control execution condition. The pitching suppressing control execution condition is satisfied, when the master cylinder oil pressure Pm becomes not lower than the oil pressure P3 that is of the predetermined threshold value (for example, about 6.0 MPa), when the vehicle braking apparatus is in the sudden stepping-on state, and when the wheel cylinder braking oil pressure Pw corresponding to the front wheel becomes not lower than the oil pressure P3. Alternatively, the pitching suppressing control execution condition is satisfied, when the vehicle braking apparatus is not in the sudden stepping-on state, when the master cylinder oil pressure Pm becomes not lower than the oil pressure P3 that is the control execution pressure, and when it is in the increased stepping-on state.

In the brake assist control (hereinafter simply referred to as "BA control"), the braking power is increased during the vehicle braking when the braking power requested by the driver cannot be obtained by the stepping-on operation of the brake pedal 12 of the driver. In the BA control, the wheel cylinder braking oil pressure Pw is forcedly boosted based on the master cylinder oil pressure Pm by satisfying a brake assist control execution condition (hereinafter simply referred to as "BA control execution condition"). In the third embodiment, the BA control is executed by driving and controlling the oil pump 34 as illustrated in FIG. 1. As described above, the brake oil that is pressurized by the oil pump 34 and ejected into the oil pressure supply conduit 36 is supplied to the wheel cylinder 20FL through the electromagnetic on-off valve 42FL and the oil pressure conduit 44FL, supplied to wheel cylinder 20FR through the electromagnetic on-off valve 42FR and the oil pressure conduit 44FR, supplied to the wheel cylinder 20RL through the electromagnetic on-off valve 42RL and the oil pressure conduit 44RL, and supplied to the wheel cylinder 20RR through the electromagnetic on-off valve 42RR and the oil pressure conduit 44RR. Accordingly, in the BA control, the wheel cylinder braking oil pressures Pw corresponding to the wheel cylinders 20FL, 20FR, 20RL, and 20RR connected to the oil pump 34, that is, corresponding to the wheels is increased at the rate of increase larger than the rate corresponding to the rate of increase of the master cylinder oil pressure Pm based on the master cylinder oil pressure Pm. That is, in the BA control, the oil pressure located on the side of the oil pump 34 from the electromagnetic on-off valves 42FL, 42FR, 42RL, and 42RR that control the wheel cylinder braking oil pressures Pw, that is, on the upstream side is controlled such that the wheel cylinder braking oil pressure Pw is boosted at the gradient higher than that of the master cylinder oil pressure Pm. At this point, the pressure rising in the BA control, the pressure rising gradient is previously set. The BA control execution condition is based on the master cylinder oil pressure Pm. For example, the BA control execution condition is satisfied, when the master cylinder oil pressure Pm becomes not lower than a BA control execution pressure P6, and when the related value relating to the change in master cylinder oil pressure Pm, for example, the differential value ΔPm of the master cylinder oil pressure Pm exceeds a BA control execution value ΔP7. A determination whether the differential value ΔPm exceeds the control execution value ΔP7 is made based on the state in which the master cylinder oil pressure Pm reaches the control execution pressure P6.

In the right and left distribution control, instability of a vehicle attitude is suppressed during the vehicle braking. In the right and left distribution control, at least a front wheel braking differential pressure between the wheel cylinder braking oil pressure Pw corresponding to the left front wheel and the wheel cylinder braking oil pressure Pw corresponding to the right front wheel is generated based on the vehicle attitude by satisfying a right and left distribution control execution condition. At least one of a control, in which a wheel cylinder braking oil pressure Pwa corresponding to one of the front wheels controls with respect to a wheel cylinder braking oil pressure Pwb corresponding to the other front wheel such that the front wheel braking differential pressure is generated based on the vehicle attitude, and a control, in which the wheel cylinder braking oil pressure Pw corresponding to one of the rear wheels controls with respect to the wheel cylinder braking oil pressure Pw corresponding to the other rear wheel such that rear wheel braking differential pressure (differential pressure between the wheel cylinder braking oil pressure Pw corresponding to the left rear wheel and the wheel cylinder braking oil pressure Pw corresponding to the right rear wheel) is generated based on the vehicle attitude, is executed in the right and left distribution control of the third embodiment. In the right and left distribution control, the vehicle attitude is estimated based on the revolution speed differences among the revolution speeds Vwi (i=fl, fr, rl, and rr) of the wheels detected by the wheel speed sensors 56FL, 56FR, 56RL, and 56RR. That is, at least one of the control in which the front wheel braking differential pressure is generated based on the revolution speed difference of the wheels and the control in which the rear wheel braking differential pressure is generated is executed in the right and left distribution control. The right and left distribution control includes a pressure reducing mode and a pressure rising mode. In the right and left distribution control, at least one of the front wheel braking differential pressure and the rear wheel braking differential pressure is generated based on the vehicle attitude by the pressure reducing mode and the pressure rising mode. In the pressure reducing mode, when the front wheel braking differential pressure is generated based on the vehicle attitude, the wheel cylinder braking oil pressure Pwb corresponding to one of the front wheels is reduced to the front wheel braking differential pressure with respect to the wheel cylinder braking oil pressure Pwa corresponding to the other front wheel. When the rear wheel braking differential pressure is generated based on the vehicle attitude, the wheel cylinder braking oil pressure Pw corresponding to one of the rear wheels is reduced to the rear wheel braking differential pressure with respect to the wheel cylinder braking oil pressure Pw corresponding to the other rear wheel. In the pressure rising mode, when the pressure is reduced based on the front wheel braking differential pressure, the wheel cylinder braking oil pressure Pwb corresponding to one of the front wheels, in which the pressure is reduced, is boosted to the wheel cylinder braking oil pressure Pwa corresponding to the other front wheel. When the pressure is reduced based on the rear wheel braking differential pressure, the wheel cylinder braking oil pressure Pw corresponding to one of the rear wheels, in which the pressure is reduced, is boosted to the wheel cylinder braking oil pressure Pw corresponding to the other rear wheel. At this point, the pressure rising gradient is previously set in the pressure rising in the pressure rising mode. For example, the pressure rising gradient is executed in the stepwise manner at a predetermined rate of increase based on the pressure rising gradient (lower than the pressure rising gradient in the BA control). The right and left distribution control execution condition is based on the vehicle attitude. For example, the right and left distribution control execution condition includes the instability of the vehicle attitude and particularly the instability of the vehicle attitude in a yaw direction. The vehicle attitude may be estimated based on not only the revolution speed difference of the wheels, but also a yaw rate of the vehicle body detected by a yaw rate sensor, a longitudinal acceleration of the vehicle body detected by a longitudinal acceleration sensor, and a lateral acceleration of the vehicle body detected by a lateral acceleration sensor.

Figure 11:
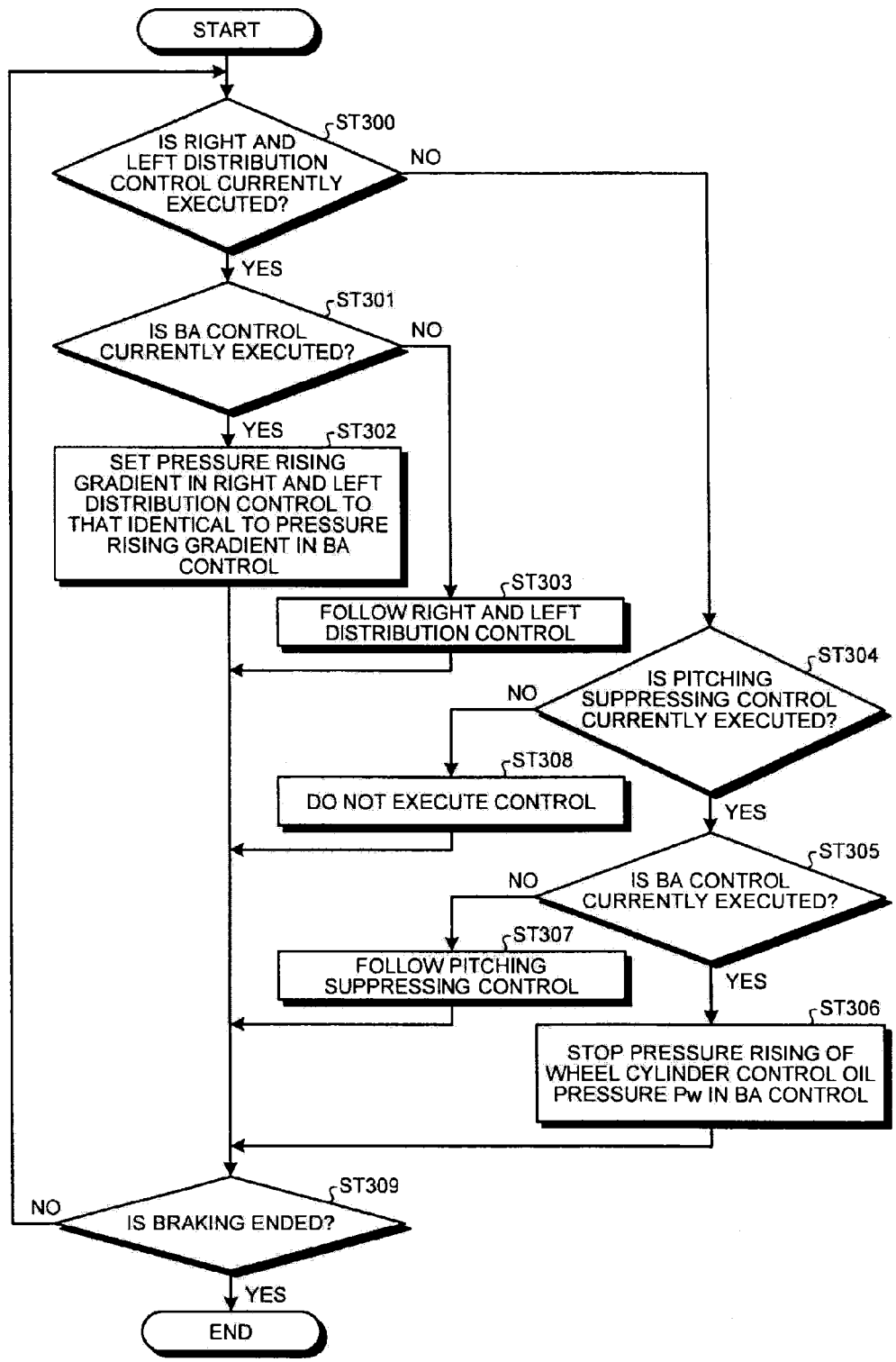
FIG. 11 is a flowchart illustrating actuation of a vehicle braking apparatus according to a third embodiment of the present invention.
Figure 12:
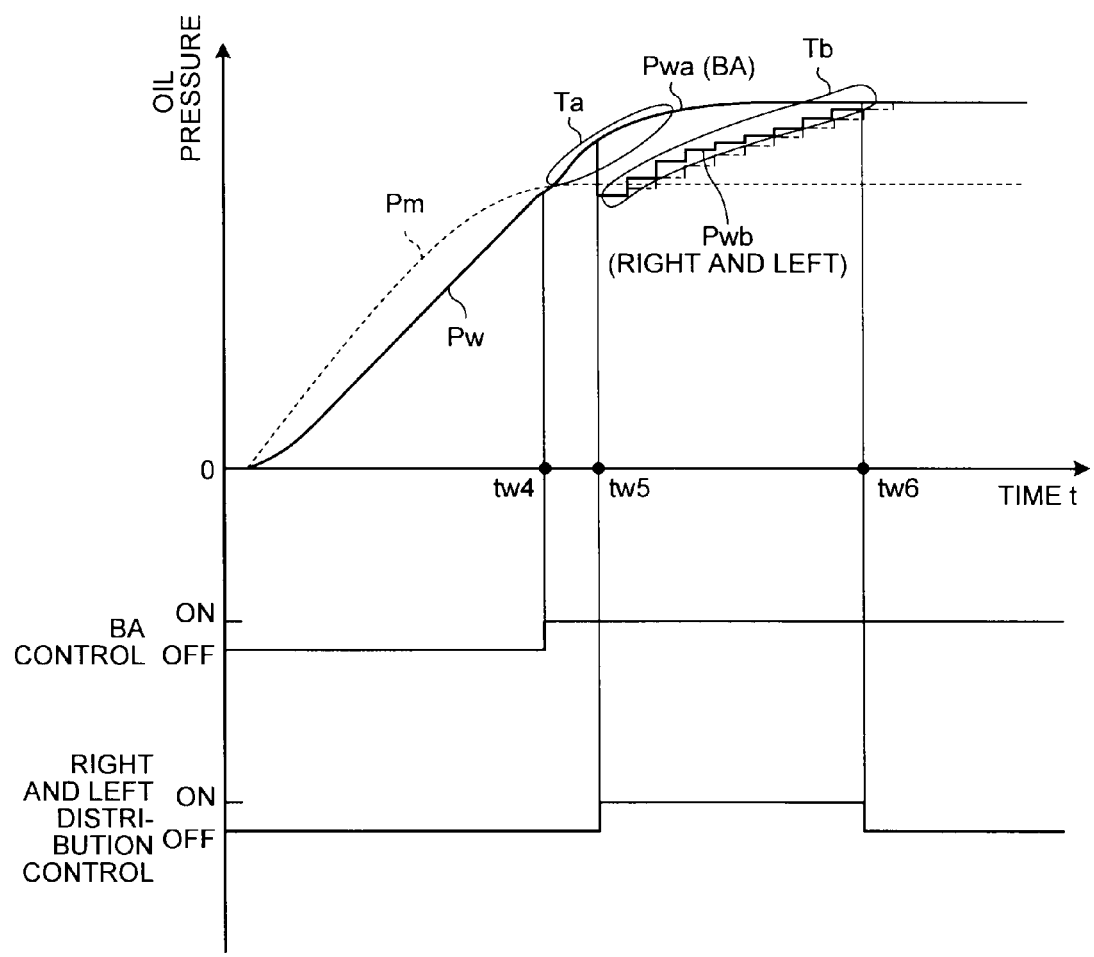
FIG. 12 is a view illustrating the relationship between the master cylinder oil pressure and the wheel cylinder braking oil pressure.
Figure 13:
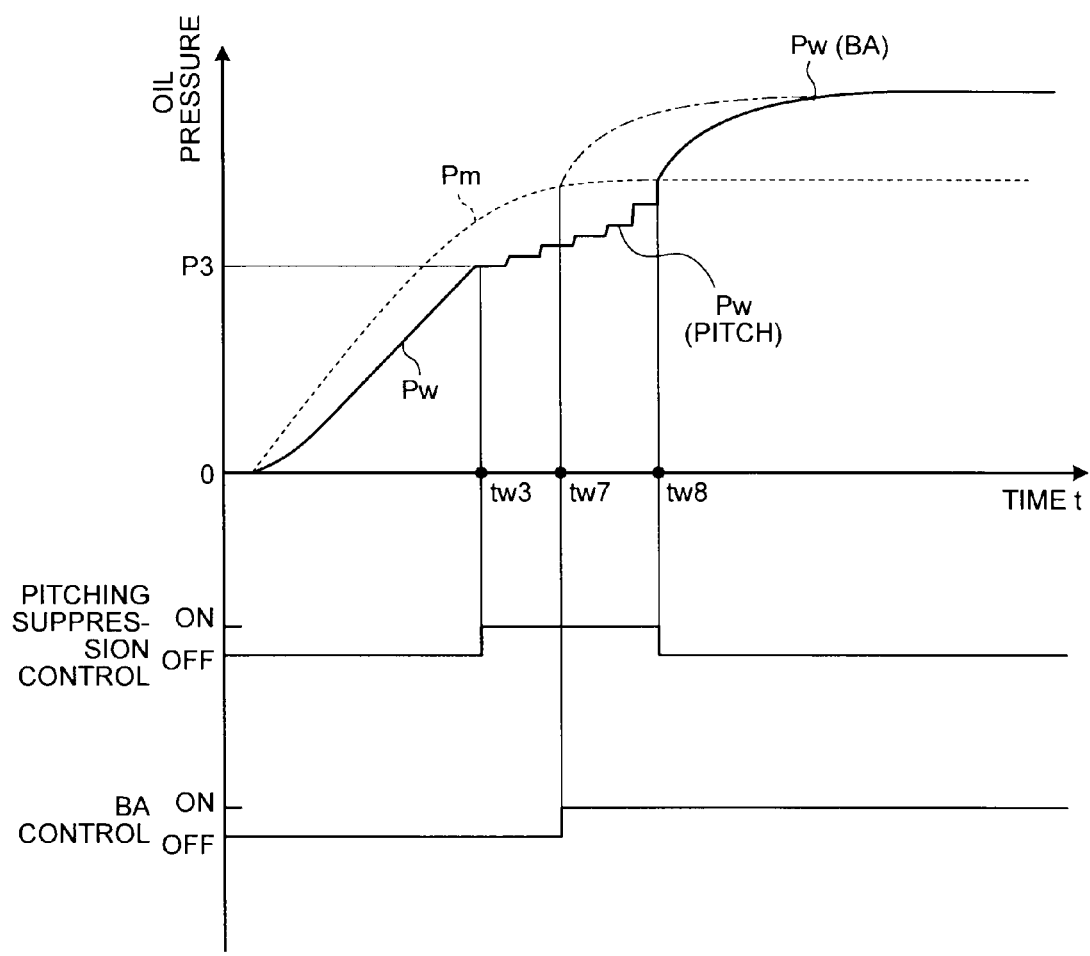
FIG. 13 is a view illustrating the relationship between the master cylinder oil pressure and the wheel cylinder braking oil pressure.
Figure 14:
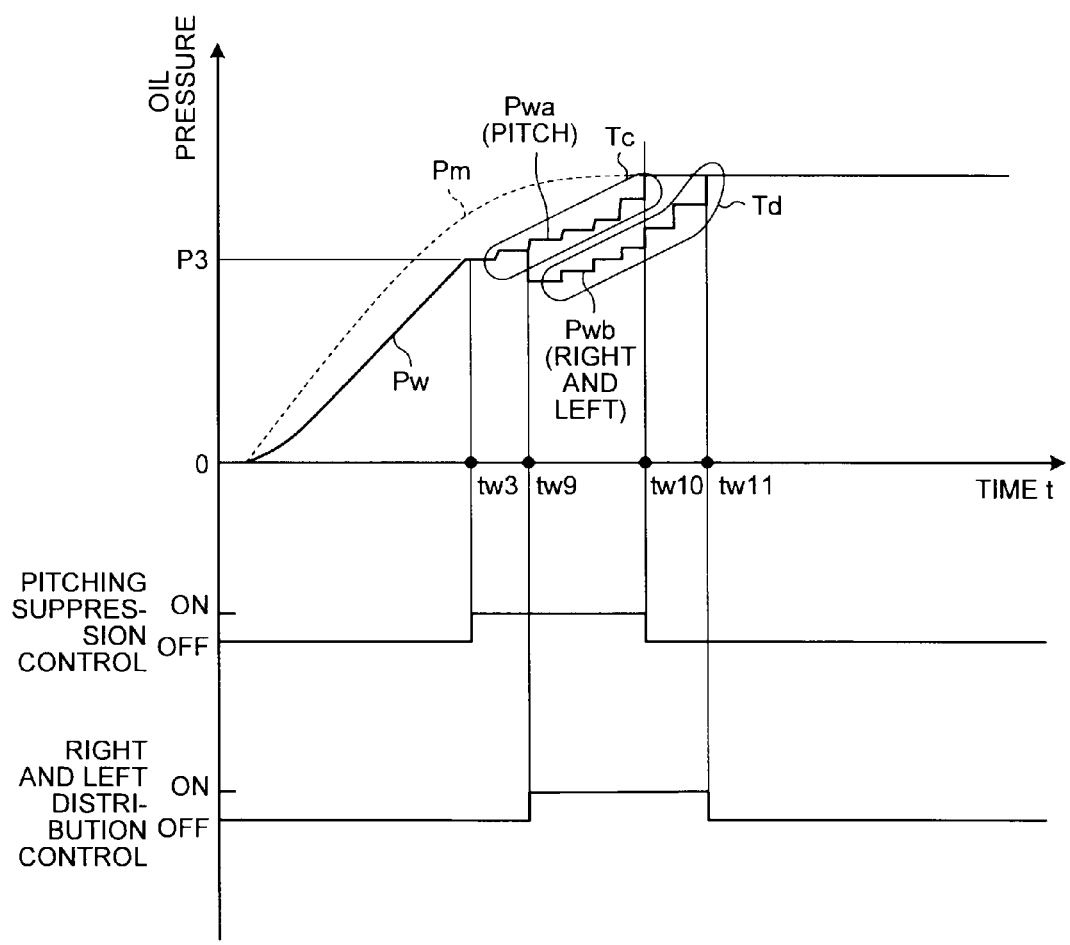
FIG. 14 is a view illustrating the relationship between the master cylinder oil pressure and the wheel cylinder braking oil pressure.

The actuation control of the vehicle braking apparatus of the third embodiment will be described below. FIG. 11 is a flowchart illustrating actuation of a vehicle braking apparatus according to a third embodiment of the present invention. FIG. 12 is a view illustrating the relationship between the master cylinder oil pressure and the wheel cylinder braking oil pressure. FIG. 13 is a view illustrating the relationship between the master cylinder oil pressure and the wheel cylinder braking oil pressure. FIG. 14 is a view illustrating the relationship between the master cylinder oil pressure and the wheel cylinder braking oil pressure. The microcomputer 60 illustrated in FIG. 2 may repeatedly perform the control computation along the flowchart illustrated in FIG. 11 at time intervals of several milliseconds to tens of milliseconds during the vehicle driving. FIG. 12 to FIG. 14 illustrates the relationship between the master cylinder oil pressure Pm and the wheel cylinder braking oil pressure Pw corresponding to the front wheel.

As illustrated in FIG. 11, after the braking is started, the microcomputer 60 determines whether the right and left distribution control is currently executed (Step ST300). Specifically, the microcomputer 60 determines whether the right and left distribution control execution condition is satisfied. For example, the microcomputer 60 may make the determination based on a state of a right and left distribution control flag. The right and left distribution control flag is set to 1 when the right and left distribution control execution condition is satisfied, and the right and left distribution control flag is set to 0 when the right and left distribution control execution condition is not satisfied.

When determining that the right and left distribution control is currently executed (Yes in Step ST300), the microcomputer 60 determines whether the BA control is currently executed (Step ST301). Specifically, the microcomputer 60 determines whether the BA control execution condition is satisfied while the right and left distribution control execution condition is satisfied. For example, the microcomputer 60 may make the determination based on a state of a BA control flag. The BA control flag is set to 1 when the BA control execution condition is satisfied, and the BA control flag is set to 0 when the BA control execution condition is not satisfied.

When determining that the BA control is currently executed (Yes in Step ST301), the microcomputer 60 sets the pressure rising gradient in the right and left distribution control to the pressure rising gradient identical to that in the BA control (Step ST302). When the right and left distribution control execution condition is satisfied, and when the BA control execution condition is satisfied in executing the right and left distribution control, the right and left distribution control is executed in priority to the BA control. That is, the right and left distribution control and the BA control are simultaneously executed. When the BA control execution condition is satisfied, the BA control is executed, and the wheel cylinder braking oil pressure Pw is forcedly boosted based on the previously fixed pressure rising gradient Ta. When the right and left distribution control execution condition is satisfied in executing the BA control, the right and left distribution control is executed while the wheel cylinder oil pressure Pw is forcedly boosted. For example, when the right and left distribution control execution condition is satisfied in executing the BA control, and when the front wheel braking differential pressure is generated based on the vehicle attitude, the BA control is executed from the time tw4 at which the BA control execution condition is satisfied (BA control ON) as illustrated in FIG. 12, and the wheel cylinder braking oil pressure Pw (solid line illustrated in FIG. 12) corresponding to the front wheel is forcedly boosted based on the previously fixed pressure rising gradient Ta. When the right and left distribution control is executed from the time tw5 at which the right and left distribution control execution condition is satisfied (right and left distribution control ON) while the wheel cylinder oil pressure Pw is forcedly boosted, the wheel cylinder braking oil pressure Pwa corresponding to one of the front wheels is forcedly boosted by the BA control (solid-line Pwa (BA) illustrated in FIG. 12). The wheel cylinder braking oil pressure Pwb corresponding to the other front wheel is reduced until the front wheel braking differential pressure can be generated based on the vehicle attitude with respect to the wheel cylinder braking oil pressure Pwa corresponding to one of the front wheels by the pressure reducing mode of the right and left distribution control, and the wheel cylinder braking oil pressure Pwb is boosted to the wheel cylinder braking oil pressure Pwa (solid-line Pwb (right and left) illustrated in FIG. 12) corresponding to one of the front wheels by the pressure rising mode after the pressure reduction. At this point, a pressure rising gradient Tb in the pressure rising mode of the right and left distribution control, that is, the pressure rising gradient Tb of the wheel cylinder braking oil pressure Pwb corresponding to the other front wheel is set to not a previously set pressure rising gradient, but a pressure rising gradient of the wheel cylinder braking oil pressure Pwa corresponding to one of the front wheels, that is, the pressure rising gradient identical to a pressure rising gradient Ta of the BA control. Therefore, when the wheel cylinder braking oil pressure Pw is forcedly boosted by the BA control, the front wheel braking differential pressure can be generated based on the vehicle attitude by executing the right and left distribution control, the change in front wheel braking differential pressure caused by the BA control can be suppressed, and the instability of the vehicle attitude can be suppressed. Accordingly, even if the BA control and the right and left distribution control are simultaneously executed, when the braking power requested by the driver cannot be obtained only by the stepping-on operation of the brake pedal 12 of the driver, both the increase in braking power and the suppression of the instability of the vehicle attitude can be achieved. Therefore, the vehicle attitude can stably be maintained while the braking power requested by the driver is generated, so that the vehicle braking can be optimized to maximally enhance the braking performance.

When determining that the BA control is not currently executed (No in Step ST301), the microcomputer 60 follows the right and left distribution control (Step ST303). At this point, the right and left distribution control is executed when the BA control execution condition is not satisfied while the right and left distribution control execution condition is satisfied. Accordingly, when the right and left distribution control is executed by satisfying the right and left distribution control execution condition, the wheel cylinder braking oil pressure Pwa corresponding to one of the front wheels becomes the wheel cylinder braking oil pressure Pw. The wheel cylinder braking oil pressure Pwb corresponding to the other front wheel is reduced until the front wheel braking differential pressure can be generated with respect to the wheel cylinder braking oil pressure Pwa corresponding to one of the front wheels by the pressure reducing mode of the right and left distribution control, and the wheel cylinder braking oil pressure Pwb is boosted to the wheel cylinder braking oil pressure Pwa corresponding to one of the front wheels based on the previously set pressure rising gradient by the pressure rising mode after the pressure reduction.

When determining that the right and left distribution control is not currently executed (No in Step ST300), the microcomputer 60 determines whether the pitching suppressing control is currently executed (Step ST304). Specifically, the microcomputer 60 determines whether the pitching suppressing control execution condition is satisfied while the right and left distribution control execution condition is not satisfied. For example, the microcomputer 60 may make the determination based on a state of a pitching suppressing control flag. The pitching suppressing control flag is set to 1 when the pitching suppressing control execution condition is satisfied, and the pitching suppressing control flag is set to 0 when the pitching suppressing control execution condition is not satisfied.

When determining that the pitching suppressing control is currently executed (Yes in Step ST304), the microcomputer 60 determines whether the BA control is currently executed (Step ST305). Specifically, the microcomputer 60 determines whether the BA control execution condition is satisfied while the pitching suppressing control execution condition is satisfied.

When determining that the BA control is currently executed (Yes in Step ST305), the microcomputer 60 stops the pressure rising of the wheel cylinder braking oil pressure Pw by the BA control (Step ST306). At this point, the BA control is not executed until the pitching suppressing control is ended, when the pitching suppressing control execution condition is satisfied, and when the BA control execution condition is satisfied in executing the pitching suppressing control. That is, while the pitching suppressing control is executed, even if the BA control execution condition is satisfied to be able to execute the BA control, the pressure rising of the wheel cylinder braking oil pressure Pw is stopped not to execute the BA control. For example, when the BA control execution condition is satisfied in executing the pitching suppressing control, and when the wheel cylinder braking oil pressure Pw can be boosted by the BA control, the pitching suppressing control is executed from the time tw3 at which the pitching suppressing control execution condition is satisfied (pitching suppressing control ON) as illustrated in FIG. 13, and the pressure rising of the wheel cylinder braking oil pressure Pw corresponding to the front wheel is reduced (solid-line Pw (pitch) illustrated in FIG. 13). At this point, even if the BA control execution condition is satisfied (time point tw7, BA control ON) while the wheel cylinder braking oil pressure Pwb is controlled by the pitching suppressing control, the pressure rising of the wheel cylinder braking oil pressure Pw is stopped not to execute the BA control (alternate long and short dash line and alternate long and two short dashes line illustrated in FIG. 13). When the BA control execution condition is satisfied (BA control ON) at a time tw8 (pitching suppressing control OFF) at which the pitching suppressing control end condition is a satisfied, the BA control is executed by performing the stopped pressure rising of the wheel cylinder braking oil pressure Pw.

At this point, the pitching suppressing control is aimed to reduce the wheel cylinder braking oil pressure Pw corresponding to the front wheel larger than usual, and the BA control is aimed to boost the wheel cylinder braking oil pressure Pw larger than usual. Accordingly, when the pitching suppressing control and the BA control are simultaneously executed by satisfying the BA control execution condition in executing the pitching suppressing control, even if the wheel cylinder braking oil pressure Pw is boosted by executing the BA control, because the pitching suppressing control is executed, the wheel cylinder braking oil pressure Pw corresponding to the front wheel is reduced by controlling the electromagnetic on-off valves 42FL and 42FR. At this point, even if the electromagnetic on-off valves 42FL and 42FR are controlled to reduce the wheel cylinder Pw corresponding to the front wheel, the oil pressure is boosted on the upstream side when the BA control is executed. Accordingly, when the BA control is being executed in ending the pitching suppressing control, the wheel cylinder braking oil pressures Pw corresponding to the reduced right and left front wheels are rapidly boosted, the rear wheel lift-up is possibly generated to degrade the effect obtained by executing the pitching suppressing control.

However, as described above, when the pitching suppressing control execution condition is satisfied, and when the BA control execution condition is satisfied while the pitching suppressing control is executed, the BA control is not executed until the pitching suppressing control is ended. That is, only the pitching suppressing control is executed when the pitching suppressing control and the BA control can simultaneously be executed. Therefore, the rear wheel lift-up can be suppressed after the pitching suppressing control is ended, and the degradation of the effect obtained by executing the pitching suppressing control can be suppressed when the pitching suppressing control and the BA control can be executed.

When determining that the BA control is not currently executed (No in Step ST305), the microcomputer 60 follows pitching suppressing control (Step ST307). At this point, the pitching suppressing control is executed, when the right and left distribution control execution condition is not satisfied, and when the BA control execution condition is not satisfied while the pitching suppressing control execution condition is satisfied. Accordingly, the pressure rising of the wheel cylinder braking oil pressure Pw corresponding to the front wheel is reduced when the pitching suppressing control is executed by satisfying the pitching suppressing control execution condition.

When determining that the pitching suppressing control is not currently executed (No in Step ST304), the microcomputer 60 does not particularly perform the control (Step ST308).

Then the microcomputer 60 determines whether the braking is ended (Step ST309). Specifically, the microcomputer 60 determines whether the driver does not perform the stepping-on operation of the brake pedal 12 based on the stepping-on stroke of the brake pedal 12 of the driver, which is detected by stroke sensor 50, in the state in which the pressure rising gradient in the right and left distribution control is set to the same value as the pressure rising gradient in the BA control in Step ST302, the state in which the microcomputer 60 follows the right and left distribution control in Step ST303, the state in which the pressure rising of the wheel cylinder braking oil pressure Pw by the BA control is stopped in Step ST306, the state in which the microcomputer 60 follows the pitching suppressing control in Step ST307, and the state in which the microcomputer 60 does not particularly perform the control in Step ST308.

When determining that the braking is ended (Yes in Step ST309), the microcomputer 60 ends the current period to transfer to the next period.

When determining that the braking is not ended (No in Step ST309), the microcomputer 60 returns to Step ST300 again to determine whether the right and left distribution control is currently executed. That is, the actuation control of the vehicle braking apparatus of the third embodiment is repeatedly performed from the braking start to the braking end.

When the microcomputer 60 determines that the braking is not ended (No in Step ST309) while following the pitching suppressing control in Step ST307, the microcomputer 60 determines whether the right and left distribution control is currently executed while the pitching suppressing control is executed in Step ST300. When the microcomputer 60 determines that the right and left distribution control is currently executed in Step ST300, and when the microcomputer 60 determines that the BA control is not currently executed in Step ST301, the microcomputer 60 follows the right and left distribution control in Step ST303. That is, when the pitching suppressing control execution condition is satisfied, and the right and left distribution control execution condition is satisfied in executing the pitching suppressing control, the right and left distribution control is executed in priority to the pitching suppressing control. That is, the pitching suppressing control and the right and left distribution control are simultaneously executed. When the pitching suppressing control execution condition is satisfied, the pitching suppressing control is executed to reduce the pressure rising of the wheel cylinder braking oil pressure Pw corresponding to the front wheel. When the right and left distribution control execution condition is satisfied in executing the pitching suppressing control, the right and left distribution control is executed while the pressure rising of the wheel cylinder braking oil pressure Pw corresponding to the front wheel is reduced. For example, when the right and left distribution control execution condition is satisfied in executing the pitching suppressing control, and when the front wheel braking differential pressure is generated based on the vehicle attitude, the pitching suppressing control is executed from the time tw3 at which the pitching suppressing control execution condition is satisfied (pitching suppressing control ON) as illustrated in FIG. 14, and the pressure rising of the wheel cylinder braking oil pressure Pw corresponding to the front wheel is reduced. Then, when the right and left distribution control is executed from a time tw9 at which the right and left distribution control execution condition is satisfied (right and left distribution control ON) while the pressure rising of the wheel cylinder braking oil pressure Pw corresponding to the front wheel is reduced, the pressure rising of the wheel cylinder braking oil pressure Pwa corresponding to one of the front wheels is reduced by the pitching suppressing control (solid-line Pwa (pitch) illustrated in FIG. 14). The wheel cylinder braking oil pressure Pwb corresponding to the other front wheel is reduced until the front wheel braking differential pressure can be generated based on the vehicle attitude with respect to the wheel cylinder braking oil pressure Pwa corresponding to one of the front wheels by the pressure reducing mode of the right and left distribution control, and the wheel cylinder braking oil pressure Pwb is boosted to the wheel cylinder braking oil pressure Pwa corresponding to one of the front wheels by the pressure reducing mode after the pressure reduction (solid-line Pwb (right and left) illustrated in FIG. 14). At this point, the pressure rising gradient in the pressure rising mode of the right and left distribution control, that is, the pressure rising gradient Td of the wheel cylinder braking oil pressure Pwb corresponding to the other front wheel is not set to the previously set pressure rising gradient, but a pressure rising gradient Tc of the wheel cylinder braking oil pressure Pwa corresponding to one of the front wheels, that is, the same value as the pressure rising gradient of the pitching suppressing control. Therefore, even if the pressure rising of the wheel cylinder braking oil pressure Pw corresponding to the front wheel is reduced by the pitching suppressing control, the front wheel braking differential pressure can be generated based on the vehicle attitude by executing the right and left distribution control, the change in front wheel braking differential pressure caused by the pitching suppressing control can be suppressed, and the instability of the vehicle attitude can be suppressed. Accordingly, even if the pitching suppressing control and the right and left distribution control are simultaneously executed, both the suppression of the rear wheel lift-up and the suppression of the instability of the vehicle attitude can be achieved. Therefore, the braking can be suppressed within the range where the excessive wheel slip or the increase in braking distance is not generated, and the vehicle attitude can stably be maintained, so that the vehicle braking can be optimized to maximally enhance the braking performance.

The embodiments of the present invention are described in detail above. However, it is clear for those skilled in the art that various changes can be made without departing from the scope of the present invention.

INDUSTRIAL APPLICABILITY

As described above, the vehicle braking apparatus of the present invention is useful to the braking apparatus of the vehicle such as the automobile, particularly to the vehicle braking apparatus that suppresses the loss of the braking effect due to the excessive wheel slip during sudden braking.

The invention claimed is:

1. A vehicle braking apparatus, wherein a rate of increase of a wheel cylinder braking oil pressure is decreased less than a rate corresponding to a rate of increase of a master cylinder oil pressure from a time at which the braking oil pressure of a wheel cylinder reaches a predetermined threshold value during vehicle braking.

2. The vehicle braking apparatus according to claim 1, wherein the wheel cylinder braking oil pressure reaches the predetermined threshold value that is estimated based on the master cylinder oil pressure.

3. The vehicle braking apparatus according to claim 2, wherein, tm1 is a time at which the master cylinder oil pressure reaches a predetermined first pressure in an initial braking stage in which a brake oil reducing amount is substantially proportional to the wheel cylinder braking oil pressure, tm3 is a time at which the master cylinder oil pressure reaches the threshold value located in a region where an increment of the brake oil reducing amount is substantially proportional to an increment of the wheel cylinder braking oil pressure, and tm2 is a time at which the master cylinder oil pressure reaches an oil pressure at a boundary between a first relationship in which the brake oil reducing amount is proportional to the wheel cylinder braking oil pressure and a second relationship in which the increment of the brake oil reducing amount is proportional to the increment of the wheel cylinder braking oil pressure, and wherein an elapsed time at which a time value (tm2−tm1) multiplied by a predetermined first factor and a time value (tm3−tm2) multiplied by a predetermined second factor elapse from tm1 is estimated to be the time at which the wheel cylinder braking oil pressure reaches the threshold value.

4. The vehicle braking apparatus according to claim 1, wherein the predetermined threshold value is estimated by directly detecting the wheel cylinder braking oil pressure.

5. The vehicle braking apparatus according to claim 1, wherein the rate of increase of the wheel cylinder braking oil pressure is decreased less than the rate corresponding to the rate of increase of the master cylinder oil pressure from the time at which the wheel cylinder braking oil pressure reaches the predetermined threshold value, when sudden braking is performed to a vehicle at a degree of braking downward that is not lower than a predetermined degree of braking downward.

6. The vehicle braking apparatus according to claim 5, wherein a determination of the degree of braking downward relating to the sudden braking of the vehicle is made based on the rate of increase of the master cylinder oil pressure.

7. The vehicle braking apparatus according to claim 5, wherein a determination of the degree of braking demand relating to the sudden braking of the vehicle is made based on the rate of increase of the wheel cylinder braking oil pressure.

8. The vehicle braking apparatus according to claim 1, wherein the wheel cylinder is a wheel cylinder of a front wheel.

9. The vehicle braking apparatus according to claim 1,
wherein a first pitching suppressing control or a second pitching suppressing control is executed,
wherein the rate of increase of the wheel cylinder braking oil pressure corresponding to the front wheel is decreased less than the rate corresponding to the rate of increase of the master cylinder oil pressure during the vehicle braking from the time at which the wheel cylinder braking oil pressure of the front wheel reaches the predetermined threshold value with the first pitching suppressing control, and
wherein the rate of increase of the wheel cylinder braking oil pressure corresponding to the front wheel is decreased less than the rate corresponding to the rate of increase of the master cylinder oil pressure during the vehicle braking when the master cylinder oil pressure reaches a control execution pressure while the first pitching suppressing control is not executed and when a value related to a change in the master cylinder oil pressure reaches the control execution value with the second pitching suppressing control.

10. The vehicle braking apparatus according to claim 9,
wherein the first pitching suppressing control is executed when a determination of sudden stepping-on state is made based on the master cylinder oil pressure, and
wherein a state in which the first pitching suppressing control is not performed is a state in which a determination of not sudden stepping-on state is made.

11. The vehicle braking apparatus according to claim 9, wherein a determination that the value related to the change in the master cylinder oil pressure reaches the control execution pressure is made in a state in which the master cylinder oil pressure reaches an increased stepping-on determination pressure that is smaller than the control execution pressure.

12. The vehicle braking apparatus according to claim 1,
wherein a pitching suppressing control and a brake assist control can be individually executed,
wherein the rate of increase of the wheel cylinder braking oil pressure corresponding to the front wheel is decreased less than the rate corresponding to the rate of increase of the master cylinder oil pressure from the time at which the wheel cylinder braking oil pressure of the front wheel reaches the predetermined threshold value during the vehicle braking with the pitching suppressing control,
wherein the wheel cylinder braking oil pressure is forcedly boosted based on the master cylinder oil pressure by satisfying a brake assist control execution condition during the vehicle braking with the brake assist control, and
wherein the brake assist control is not executed until the pitching suppressing control is ended, when the brake assist control execution condition is satisfied in executing the pitching suppressing control.

13. The vehicle braking apparatus according to claim 1,
wherein a pitching suppressing control and a right and left distribution control can individually be executed,
wherein the rate of increase of the wheel cylinder braking oil pressure corresponding to a front wheel is decreased less than the rate corresponding to the rate of increase of the master cylinder oil pressure from the time at which the wheel cylinder braking oil pressure of the front wheel reaches the predetermined threshold value during the vehicle braking with the pitching suppressing control,
wherein at least a front wheel braking differential pressure is generated between the wheel cylinder braking oil pressure corresponding to a left front wheel and the wheel cylinder braking oil pressure corresponding to a right front wheel based on a vehicle attitude by satisfying a right and left distribution control execution condition during the vehicle braking with the right and left distribution control, and
wherein the right and left distribution control is executed when the right and left distribution control execution conditions of the right and left front wheels are satisfied in executing the pitching suppressing control, and
wherein the vehicle attitude is estimated based on at least one of a revolution speed difference of the left front wheel and the right front wheel, a yaw rate of a vehicle body, a longitudinal acceleration of the vehicle body, and a lateral acceleration of the vehicle body.

14. The vehicle braking apparatus according to claim 9,
wherein the first pitching suppressing control, the second pitching suppressing control, and a brake assist control can be individually executed,
wherein the wheel cylinder braking oil pressure is forcedly boosted based on the master cylinder oil pressure by satisfying a brake assist control execution condition during the vehicle braking with the brake assist control, and
wherein the brake assist control is not executed until a pitching suppressing control is ended, when the brake assist control execution condition is satisfied in executing one of the first pitching suppressing control and the second pitching suppression control.

15. The vehicle braking apparatus according to claim 9,
wherein the first pitching suppressing control, the second pitching suppression control, and a right and left distribution control can individually be executed,
wherein at least a front wheel braking differential pressure is generated between the wheel cylinder braking oil pressure corresponding to a left front wheel and the wheel cylinder braking oil pressure corresponding to a right front wheel based on a vehicle attitude by satisfying a right and left distribution control execution condition during the vehicle braking with the right and left distribution control, and
wherein the right and left distribution control is executed when the right and left distribution control execution condition is satisfied in executing one of the first pitching suppressing control and the second pitching suppressing control, and wherein the vehicle attitude is estimated based on at least one of a revolution speed difference of the left front wheel and the right front wheel, a yaw rate of a vehicle body, a longitudinal acceleration of the vehicle body, and a lateral acceleration of the vehicle body.

16. The vehicle braking apparatus according to claim 2, wherein a pitching suppressing control and a brake assist control can be individually executed, wherein the rate of increase of the wheel cylinder braking oil pressure corresponding to a front wheel is decreased less than the rate corresponding to the rate of increase of the master cylinder oil pressure from the time at which the wheel cylinder braking oil pressure of the front wheel reaches the predetermined threshold value during the vehicle braking with the pitching suppressing control, wherein the wheel cylinder braking oil pressure is forcedly boosted based on the master cylinder oil pressure by satisfying a brake assist control execution condition during the vehicle braking with the brake assist control, and wherein the brake assist control is not executed until the pitching suppressing control is ended, when the brake assist control execution condition is satisfied in executing the pitching suppressing control.

17. The vehicle braking apparatus according to claim 3, wherein a pitching suppression control and a brake assist control can be individually executed, wherein the rate of increase of the wheel cylinder braking oil pressure corresponding to the front wheel is decreased less than the rate corresponding to the rate of increase of the master cylinder oil pressure from the time at which the wheel cylinder braking oil pressure of the front wheel reaches the predetermined threshold value during the vehicle braking with the pitching suppressing control, wherein the wheel cylinder braking oil pressure is forcedly boosted based on the master cylinder oil pressure by satisfying a brake assist control execution condition during the vehicle braking with the brake assist control, and wherein the brake assist control is not executed until the pitching suppressing control is ended, when the brake assist control execution condition is satisfied in executing the pitching suppressing control.

18. The vehicle braking apparatus according to claim 4, wherein a pitching suppressing control and a brake assist control can be individually executed, wherein the rate of increase of the wheel cylinder braking oil pressure corresponding to a front wheel is decreased less than the rate corresponding to the rate of increase of the master cylinder oil pressure from the time at which the wheel cylinder braking oil pressure of the front wheel reaches the predetermined threshold value during the vehicle braking with the pitching suppressing control, wherein the wheel cylinder braking oil pressure is forcedly boosted based on the master cylinder oil pressure by satisfying a brake assist control execution condition during the vehicle braking with the brake assist control, and wherein the brake assist control is not executed until the pitching suppressing control is ended, when the brake assist control execution condition is satisfied in executing the pitching suppressing control.

19. The vehicle braking apparatus according to claim 5, wherein a pitching suppressing control and a brake assist control can be individually executed, wherein the rate of increase of the wheel cylinder braking oil pressure corresponding to a front wheel is decreased less than the rate corresponding to the rate of increase of the master cylinder oil pressure from the time at which the wheel cylinder braking oil pressure of the front wheel reaches the predetermined threshold value during the vehicle braking with the pitching suppressing control, wherein the wheel cylinder braking oil pressure is forcedly boosted based on the master cylinder oil pressure by satisfying a brake assist control execution condition during the vehicle braking with the brake assist control, and wherein the brake assist control is not executed until the pitching suppressing control is ended, when the brake assist control execution condition is satisfied in executing the pitching suppressing control.

20. The vehicle braking apparatus according to claim 6, wherein a pitching suppression control and a brake assist control can be individually executed, wherein the rate of increase of the wheel cylinder braking oil pressure corresponding to a front wheel is decreased less than the rate corresponding to the rate of increase of the master cylinder oil pressure from the time at which the wheel cylinder braking oil pressure of the front wheel reaches the predetermined threshold value during the vehicle braking with the pitching suppression control, wherein the wheel cylinder braking oil pressure is forcedly boosted based on the master cylinder oil pressure by satisfying a brake assist control execution condition during the vehicle braking with the brake assist control, and wherein the brake assist control is not executed until the pitching suppressing control is ended, when the brake assist control execution condition is satisfied in executing the pitching suppressing control.

* * * * *